(12) United States Patent
Komiya et al.

(10) Patent No.: US 8,776,843 B2
(45) Date of Patent: Jul. 15, 2014

(54) SUCTION NOZZLE, SUCTION DEVICE, GAS FILLING DEVICE, GAS CONSUMING DEVICE AND GAS FILLING SYSTEM

(75) Inventors: Kenji Komiya, Numazu (JP); Toshiyuki Kondo, Chiryu (JP); Hideyo Omori, Susono (JP); Noriyasu Yamada, Mishima (JP); Kunihiro Ishii, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 57 days.

(21) Appl. No.: 13/497,205

(22) PCT Filed: Sep. 14, 2011

(86) PCT No.: PCT/JP2011/005162
§ 371 (c)(1),
(2), (4) Date: Mar. 20, 2012

(87) PCT Pub. No.: WO2013/038445
PCT Pub. Date: Mar. 21, 2013

(65) Prior Publication Data
US 2013/0061983 A1   Mar. 14, 2013

(51) Int. Cl.
*B65B 1/04* (2006.01)
*B65B 3/04* (2006.01)

(52) U.S. Cl.
CPC . *B65B 3/04* (2013.01); *Y02E 60/321* (2013.01)
USPC ............... 141/93; 141/59; 141/69; 141/82; 141/98; 141/383

(58) Field of Classification Search
USPC ............... 141/59, 65–66, 69, 82, 93, 98, 296, 141/346–350, 382–383
See application file for complete search history.

(56) References Cited

U.S. PATENT DOCUMENTS

| | | | |
|---|---|---|---|
| 3,907,010 A | 9/1975 | Burtis et al. | |
| 4,262,712 A | 4/1981 | Young | |
| 5,301,723 A * | 4/1994 | Goode | 141/82 |
| 5,365,981 A * | 11/1994 | Peschka et al. | 141/7 |
| 5,385,178 A * | 1/1995 | Bedi | 141/59 |
| 5,429,155 A | 7/1995 | Brzyski et al. | |
| 5,996,649 A * | 12/1999 | Sutton et al. | 141/59 |
| 6,196,280 B1 * | 3/2001 | Tate et al. | 141/302 |
| 6,675,841 B2 * | 1/2004 | Burns | 141/59 |
| 7,082,969 B1 * | 8/2006 | Hollerback | 141/59 |

FOREIGN PATENT DOCUMENTS

| | | |
|---|---|---|
| DE | 4219912 A1 | 12/1993 |
| DE | 4414102 A1 | 11/1994 |
| DE | 4041337 C2 | 5/1996 |
| JP | 2005-069326 A | 3/2005 |

(Continued)

OTHER PUBLICATIONS

International Search Report issued Oct. 25, 2011 in PCT/JP2011/005162.

*Primary Examiner* — Timothy L Maust
*Assistant Examiner* — Timothy P Kelly
(74) *Attorney, Agent, or Firm* — Kenyon & Kenyon LLP

(57) ABSTRACT

A suction nozzle, which is configured to be interlocked with a gas filler nozzle used to supply a gas to a gas consuming device, comprises a suction port configured to suck moisture inside the gas filler nozzle when the suction nozzle is interlocked with the gas filler nozzle.

9 Claims, 20 Drawing Sheets

(56) References Cited

FOREIGN PATENT DOCUMENTS

| | | |
|---|---|---|
| JP | 2005-069330 A | 3/2005 |
| JP | 4305558 B2 | 7/2009 |
| JP | 2010-144936 A | 7/2010 |
| JP | 4621195 B2 | 1/2011 |
| JP | 2011-033165 A | 2/2011 |
| JP | 2011-047491 A | 3/2011 |
| WO | 2010/067444 A1 | 6/2010 |

* cited by examiner

SUCTION NOZZLE, SUCTION DEVICE, GAS FILLING DEVICE, GAS CONSUMING DEVICE AND GAS FILLING SYSTEM

This is a 371 national phase application of PCT/JP2011/005162 filed 14Sep. 2011, the contents of which are incorporated herein by reference.

BACKGROUND

1. Technical Field

The present invention relates to a suction nozzle, a suction device, a gas filling device, a gas consuming device and a gas filling system.

2. Related Art

Recently a fuel cell vehicle using hydrogen gas as a fuel gas has been ready for practical use. Stable supply of hydrogen gas to the fuel cell vehicle is essential to promote the spread of the fuel cell vehicle. At a hydrogen supply station for supplying hydrogen gas to the fuel cell vehicle, a nozzle of a gas filling device as a supplier is interlocked with a receptacle of the vehicle to fill the hydrogen gas accumulated under high pressure from the gas filling device to a tank of the vehicle.

In order to suppress a temperature rise in the tank of the vehicle during filling of the hydrogen gas, the hydrogen gas in the supplier is generally pre-cooled to around −20° C. to −40° C. During filling of the hydrogen gas, the interlocked receptacle and nozzle are cooled down by the flow of the low-temperature hydrogen gas. Such cooling may, however, lead to dew condensation of the moisture contained in the air on the surface of the receptacle and inside the receptacle structure. This may cause the moisture to be frozen in between the receptacle and the nozzle and may interfere with smooth removal of the nozzle from the receptacle. This may also interfere with exchange of signals and information via contacts between the receptacle and the nozzle. An exemplary technique proposed to solve this problem measures the temperature of the receptacle or the nozzle during the gas filling and stops the gas filling when the measured temperature is lowered to or below a preset level (PTL 1).

CITATION LIST

Patent Literatures

PTL 1: JP 2011-047491
PTL 2: JP 2011-033165
PTL 3: WO2010/067444

SUMMARY

Technical Problem

This proposed technique, however, undesirably complicates the device structures of the supplier and the vehicle, while lowering the gas supply efficiency. There is accordingly still room for improvement in supply of hydrogen gas to the fuel cell vehicle by interlocking the nozzle with the receptacle. This problem is not characteristic of the fuel cell vehicle but is commonly found in any system of filling hydrogen gas into a gas storage tank of another system, for example, a stationary fuel cell system.

The present invention is made to solve at least part of the foregoing, and an object is to readily prevent a potential failure or trouble due to freezing of the moisture in between a receptacle and nozzle when the nozzle is interlocked with the receptacle to supply a gas to a gas consuming device, such as a fuel cell vehicle.

Solution to Problem

In order to achieve at least part of the foregoing, the present invention provides various aspects and embodiments described below.

Aspect 1:

A suction nozzle configured to be interlocked with a gas filler nozzle, the gas filler nozzle being to be used to supply a gas to a gas consuming device, comprising:

a suction port configured to suck moisture inside the gas filler nozzle when the suction nozzle is interlocked with the gas filler nozzle.

The suction nozzle of this aspect can suck the moisture inside the gas filler nozzle by simply interlocking the gas filler nozzle with the suction nozzle in the state except the gas supply. This readily prevents a potential failure or trouble due to freezing of the moisture in between the receptacle and the nozzle when the gas filler nozzle is subsequently interlocked with the receptacle to supply a gas to the gas consuming device.

Aspect 2:

The suction nozzle according to aspect 1, wherein the suction nozzle has a cylindrical outer shape for positioning within an opening of the gas filler nozzle, so as to be interlocked with the gas filler nozzle, an outer periphery of the suction nozzle is opposed to an inner periphery of the gas filler nozzle when the suction nozzle is interlocked with the gas filler nozzle, and the suction port is formed in the outer periphery.

According to this aspect, the suction port provided on the suction nozzle is arranged to be opposed to the inner periphery of the gas filler nozzle when the suction nozzle is interlocked with the gas filler nozzle. This enables the moisture inside the gas filler nozzle to be readily sucked.

Aspect 3:

The suction nozzle according to aspect 2, wherein the gas filler nozzle has a movable locking member provided on the inner periphery to lock the suction nozzle when the suction nozzle is interlocked with the gas filler nozzle, and the suction port is provided at a position opposed to the locking member when the suction nozzle is interlocked with the gas filler nozzle.

According to this aspect, the suction port provided on the suction nozzle is arranged to be opposed to the movable locking member, which is prone to adhesion and accumulation of the moisture, when the suction nozzle is interlocked with the gas filler nozzle. This more effectively prevents a potential failure or trouble due to freezing of the moisture in between the receptacle and the nozzle. Additionally, when a space is provided between the inner periphery of the gas filler nozzle and the outer periphery of the suction nozzle, the moisture inside the space can be readily sucked from between the movable locking member and the inner periphery.

Aspect 4:

The suction nozzle according to either one of aspects 2 and 3, further comprising:

a circular seal member provided on the outer periphery, wherein the seal member slides on the inner periphery of the gas filler nozzle when the suction nozzle is being inserted into the opening of the gas filler nozzle, and thereby moves moisture adhering to the inner periphery relatively toward the suction port.

According to this aspect, the seal member serves to move the moisture adhering to the inner periphery of the gas filler nozzle relatively toward the suction port, so as to enable the moisture to be readily sucked through the suction port.

Aspect 5:

The suction nozzle according to any one of aspects 1 to 4, further comprising:

a heating body configured to heat the gas filler nozzle when the suction nozzle is interlocked with the gas filler nozzle.

The suction nozzle of this aspect can heat the gas filler nozzle, which has been cooled by the supply of the gas, so as to prevent dew condensation inside the gas filler nozzle.

Aspect 6:

The suction nozzle according to any one of aspects 1 to 5, further comprising:

a sealing member provided to seal a gas supply port of the gas supply nozzle when the suction nozzle is interlocked with the gas filler nozzle.

According to this aspect, the sealing member serves to seal the gas supply port of the gas filler nozzle during suction of the inside of the gas filler nozzle. This enhances the suction efficiency.

Aspect 7:

A suction device configured to suck moisture inside a gas filler nozzle, comprising:

the suction nozzle according to any one of aspects 1 to 6;

a suction mechanism configured to give a suction force to the suction port; and a support base configured to support the suction nozzle, wherein the suction nozzle is attached to the support base such that a distal end of the suction nozzle is directed upward from a horizontal direction.

According to this aspect, the gas filler nozzle interlocked with the suction nozzle is arranged to have the opening directed downward from the horizontal direction, so that the moisture inside the gas filler nozzle moves toward the opening. This enables the moisture to be readily sucked through the suction port of the suction nozzle.

Aspect 8:

The suction device according to aspect 7, further comprising:

a vibration mechanism configured to vibrate the suction nozzle when the suction nozzle is interlocked with the gas filler nozzle.

According to this aspect, vibrating the gas filler nozzle interlocked with the suction nozzle accelerates the motion of the moisture inside the gas filler nozzle. This enables the moisture to be readily sucked through the suction port of the suction nozzle.

Aspect 9:

A gas filling device configured to supply a gas to a gas consuming device, comprising:

the suction nozzle according to claim 3;

the gas filler nozzle according to claim 3; and a suction mechanism configured to give a suction force to a suction port of the suction nozzle, wherein the gas filler nozzle comprises:

an outer peripheral wall having a cylindrical shape;

an inner peripheral wall located inside the outer peripheral wall;

a space formed between the inner peripheral wall and the outer peripheral wall; and a sleeve member configured to be movable in the space in an axial direction of the gas filler nozzle and to come into contact with a back face of the locking member to swing the locking member, and wherein the sleeve member has a groove which is provided on a surface opposed to the inner peripheral wall and which is extended along the axial direction.

According to this aspect, the flow path to allow for the flow of the moisture and the air is formed between the inner peripheral wall and the sleeve member. This enables the moisture accumulated in the space to be readily sucked by the suction nozzle.

Aspect 10:

The gas filling device according to aspect 9, further comprising:

an operation unit configured to receive a user's input;

a storage tank configured to store a gas;

a valve configured to switch between delivery and non-delivery of the gas stored in the storage tank through the gas filler nozzle to outside thereof, and a controller configured to control the suction mechanism and the valve, wherein when the operation unit receives an input, the controller drives the suction mechanism to suck moisture inside the gas filler nozzle and subsequently opens the valve to deliver the gas toward the gas filler nozzle.

According to this aspect, the gas filler nozzle is interlocked with the suction nozzle in the state except the gas supply, so that the suction nozzle can suck the moisture inside the gas filler nozzle. This readily prevents a potential failure or trouble due to freezing of the moisture in between the receptacle and the nozzle when the gas filler nozzle is subsequently interlocked with the receptacle to supply the gas to the gas consuming device. Additionally, sucking the moisture immediately before the gas filling advantageously reduces a potential trouble, such as adhesion of the moisture to the gas filler nozzle, which may be caused by rainfall after the suction.

Aspect 11:

A gas consuming device, comprising:

a receptacle configured to be interlocked with a gas filler nozzle of a gas filling device;

a tank configured to accumulate a gas supplied from the gas filling device via the receptacle; and a fuel cell configured to consume the gas accumulated in the tank to generate electric power, wherein the receptacle has a suction port configured to suck moisture inside the gas filler nozzle.

This aspect prevents the moisture from being frozen in between the gas filler nozzle and the receptacle even when an existing gas filling device is used to fill the gas. The gas filler nozzle is not required to be detached during the time period between the suction of the moisture inside the gas filler nozzle and the start of the gas supply. This reduces a potential trouble, such as dew condensation in the gas filler nozzle after the suction. Additionally, sucking the moisture immediately before the gas filling advantageously reduces a potential trouble, such as adhesion of the moisture to the gas filler nozzle, which may be caused by rainfall after the suction.

Aspect 12:

A gas filling system comprising:

a gas consuming device; and a gas filling device configured to supply a gas to the gas consuming device, wherein the gas filling device comprises a gas filler nozzle, the gas consuming device comprises a receptacle to be interlocked with the gas filler nozzle, at least one of the gas filler nozzle and the receptacle has a suction port configured to suck moisture inside the gas filler nozzle when the gas filler nozzle is interlocked with the receptacle, and at least one of the gas filling device and the gas consuming device has a suction mechanism configured to give a suction force to the suction port.

According to this aspect, at least one of the gas filler nozzle and the receptacle has the suction port configured to suck the moisture inside the gas filler nozzle. This enables suction of the moisture inside the gas filler nozzle.

The present invention may be actualized by diversity of applications, for example, a gas filling system configured to include at least one of the suction nozzle, the gas filler nozzle and the receptacle, a vehicle equipped with the receptacle, a method of sucking the moisture from the gas filler nozzle, and a gas filling method including a step of sucking the moisture from the gas filler nozzle. The suction nozzle or the suction device according to the invention may be optionally combined with another suitable member.

DESCRIPTION OF EMBODIMENTS

A. First Embodiment

Figure 1:
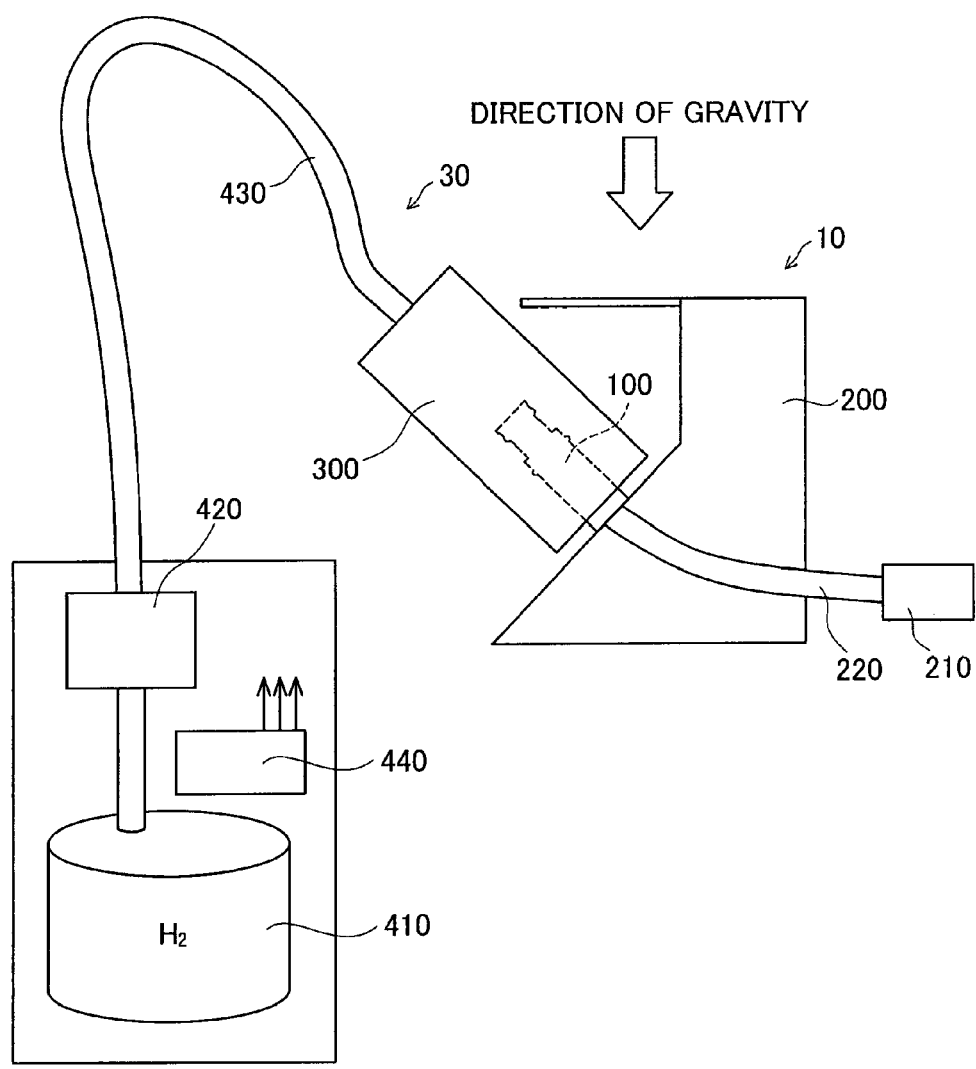
FIG. 1 illustrates the general configuration of a hydrogen supply station including a suction device.
Figure 2:
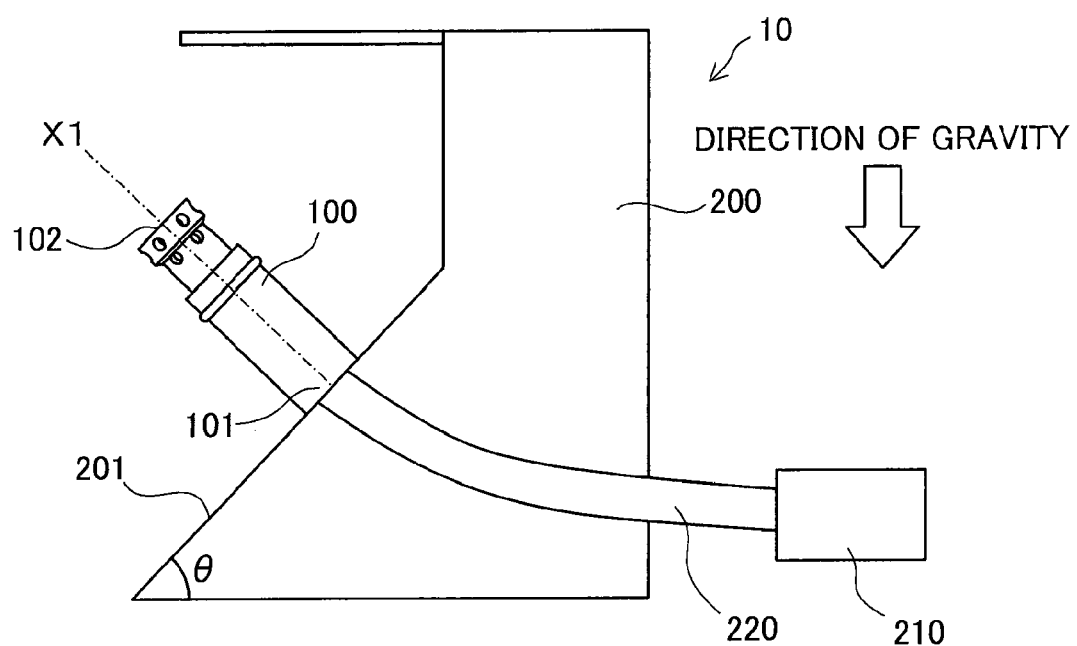
FIG. 2 illustrates the general configuration of the suction device.

FIG. 1 illustrates the general configuration of a hydrogen supply station including a suction device. FIG. 2 illustrates the general configuration of the suction device. As shown in FIG. 1, the hydrogen supply station configured to supply hydrogen gas to a fuel cell vehicle includes a suction device 10 and a gas filling device 30. The suction device 10 serves to suck, e.g., the moisture adhering to a gas filler nozzle 300 included in the gas filling device 30. The suction device 10 includes a suction nozzle 100, a nozzle support base 200 and a compressor 210.

Referring to FIG. 2, the suction nozzle 100 is in a cylindrical shape and has a base end 101 attached to the nozzle support base 200, such that a peripheral end 102 is directed upward from the horizontal direction. More specifically, the nozzle support base 200 has an inclined surface 201 having a preset angle θ to the horizontal direction. The suction nozzle 100 is fixed to the inclined surface 201, such that its axial direction X1 is parallel to the normal to the inclined surface 201. The detailed structure of the suction nozzle 100 will be described later with reference to FIG. 3.

The compressor 210 is connected with the base end 101 of the suction nozzle 100 via a suction pipe 220. The suction device 10 drives the compressor 210 to give a suction force to suction ports formed on the suction nozzle 100 as described later. The compressor 210 may be triggered by any arbitrary condition, for example, an ON operation of a switch (not shown), detection of the use state of the suction device 10 by a sensor, a timer, or input of a predetermined signal by a controller (not shown).

As shown in FIG. 1, the suction device 10 is used in the state that the gas filler nozzle 300 of the gas filling device 30 is interlocked with the suction nozzle 100. More specifically, the compressor 210 is driven in the state that the gas filler nozzle 300 is interlocked with the suction nozzle 100, so as to suck the moisture adhering to the inside of the gas filler nozzle 300.

The gas filling device 30 serves to supply hydrogen gas to a fuel cell vehicle and includes the gas filler nozzle 300, a storage tank 410, a valve 420, a supply hose 430 and a controller 440. In the gas filling device 30, the controller 440 opens and closes the valve 420 to deliver the pre-cooled hydrogen gas accumulated in the storage tank 410 to the supply hose 430. The hydrogen gas delivered to the supply hose 430 is supplied to the fuel cell vehicle via a receptacle, with which the gas filler nozzle 300 is interlocked. A cooling mechanism configured to pre-cool the hydrogen gas and a compression mechanism configured to pressurize the hydrogen gas are omitted from the illustration of this embodiment.

Figure 3:
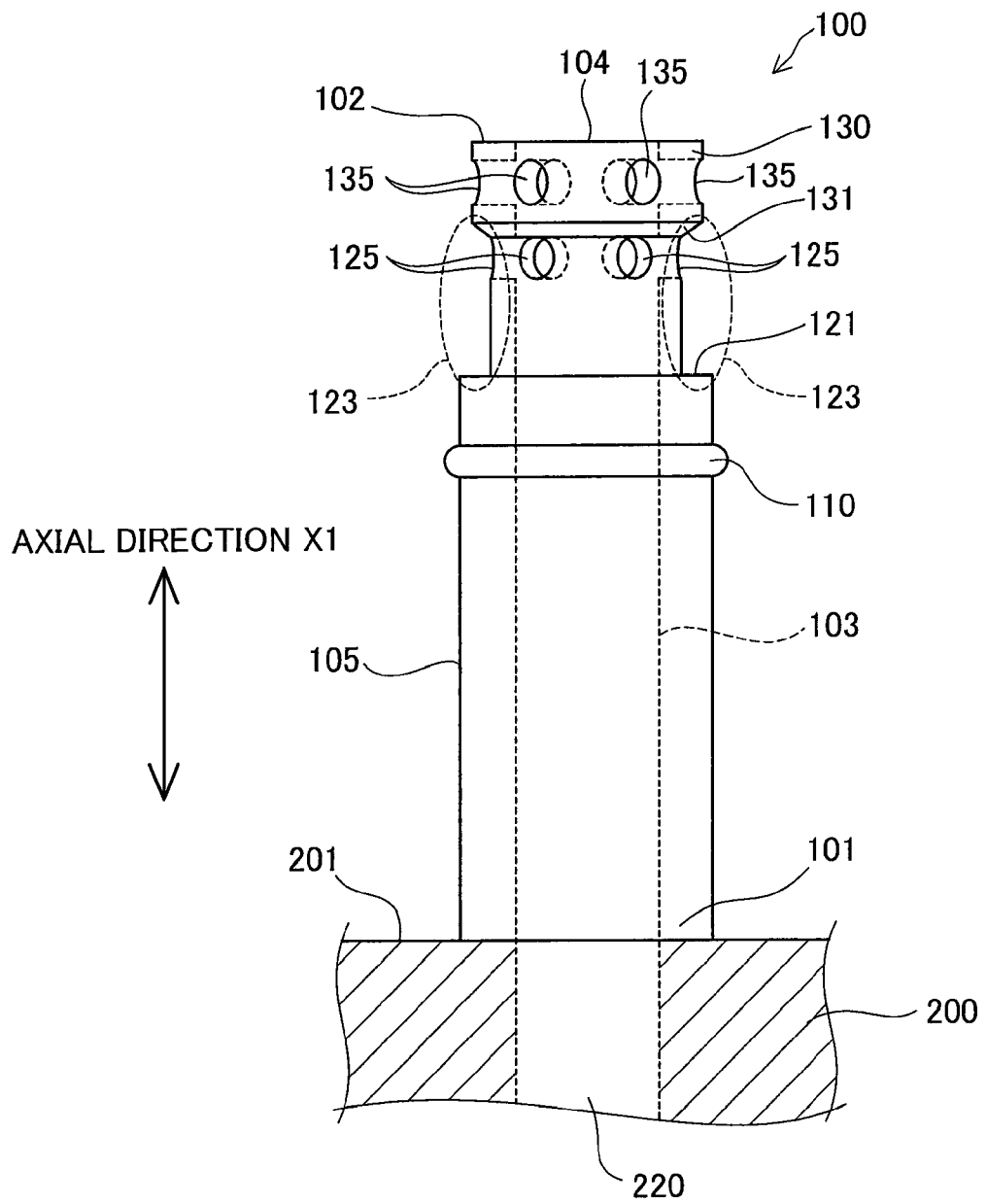
FIG. 3 illustrates the general structure of the suction nozzle.

FIG. 3 illustrates the general structure of the suction nozzle. The suction nozzle 100 is in a hollow cylindrical shape and is made from a metal, such as stainless steel. A hollow space 103 formed inside the suction nozzle 100 communicates with the outside via an opening 104 formed on the peripheral end 102 of the suction nozzle 100. The hollow space 103 also communicates with the suction pipe 220 at the base end 101 of the suction nozzle 100.

The suction nozzle 100 has a circular O-ring 110 made of, for example, rubber or resin. The O-ring 110 is provided around an outer periphery 105 of the suction nozzle 100 in the middle of the base end 101 and the peripheral end 102. The O-ring 110 serves to seal the clearance between the suction nozzle 100 and the gas filler nozzle 300, which is interlocked with the suction nozzle 100, and thereby improve the gas tightness.

The suction nozzle 100 has a step 121 provided closer to the peripheral end 102 than the O-ring 110, and a small-diameter portion 123 of the reduced nozzle outer diameter provided on the peripheral end 102-side of the step 121. The suction nozzle 100 also has a flange 130 of the larger outer diameter than the small-diameter portion 123 provided on the peripheral end 102-side of the small-diameter portion 123. An inclined step 131 formed at the base of the flange 130 engages with projections of lock pins (described later) provided on the gas filler nozzle 300, when the gas filler nozzle 300 is interlocked with the suction nozzle 100. The engagement between the step 131 of the flange 130 and the projections of the lock pins will be described later.

The suction nozzle 100 has a plurality of suction ports 125 on the small-diameter portion 123 (hereinafter called "small-diameter portion suction ports"). The small-diameter portion suction ports 125 are through holes of the circular cross section. The plurality of (for example, six) the small-diameter portion suction ports 125 are arranged at equal intervals along the circumferential direction of the outer periphery 105 of the suction nozzle 100. The small-diameter portion suction ports 125 connect the hollow space 103 to the outside.

The suction nozzle 100 also has a plurality of suction ports 135 on the flange 130 (hereinafter called "flange suction ports"). The flange suction ports 135 have the circular cross section, like the small-diameter portion suction ports 125. The plurality of the flange suction ports 135 are arranged at equal intervals along the circumferential direction of the outer periphery 105 of the suction nozzle 100. According to this embodiment, the small-diameter portion suction ports 125 and the flange suction ports 135 are the through holes of the circular cross section. According to other embodiments, the through holes may be in any arbitrary shape, e.g., elliptical shape or rectangular shape. There is no limitation on the numbers of these suction ports. The suction ports 125 and the suction ports 135 may be in different shapes.

Figure 4:
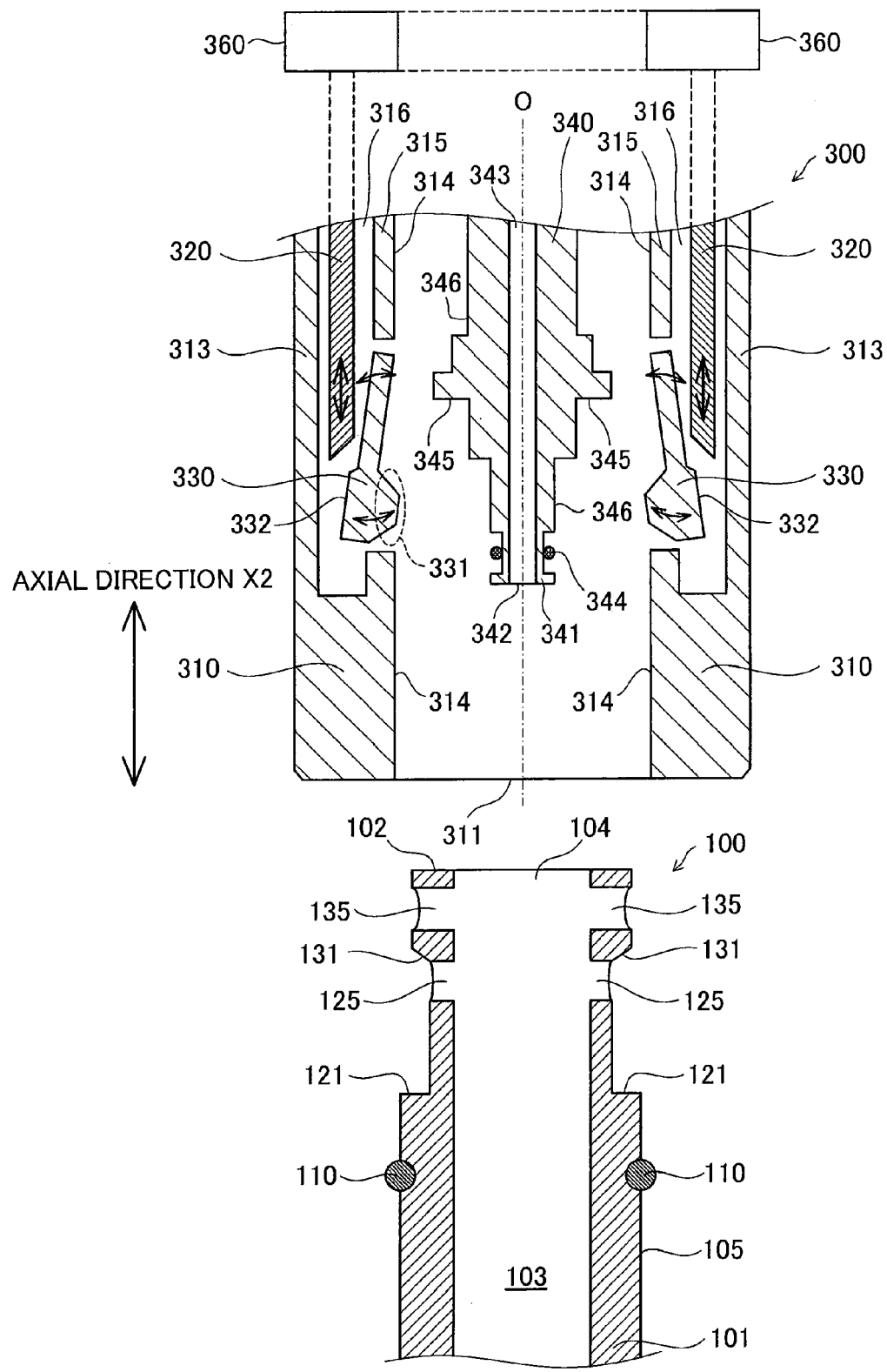
FIG. 4 illustrates the state before interlocking the gas filler nozzle with the suction nozzle.
Figure 5:
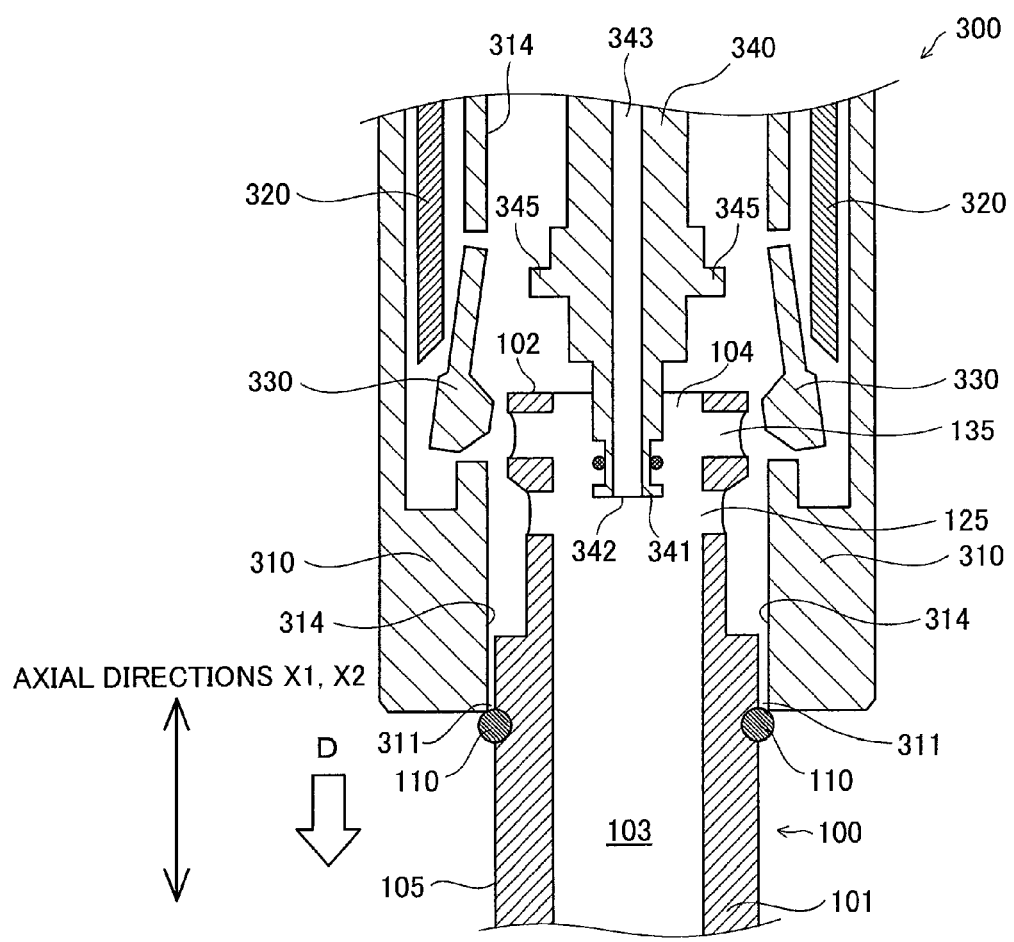
FIG. 5 illustrates the state that the suction nozzle is inserted into the opening of the gas filler nozzle.
Figure 6:
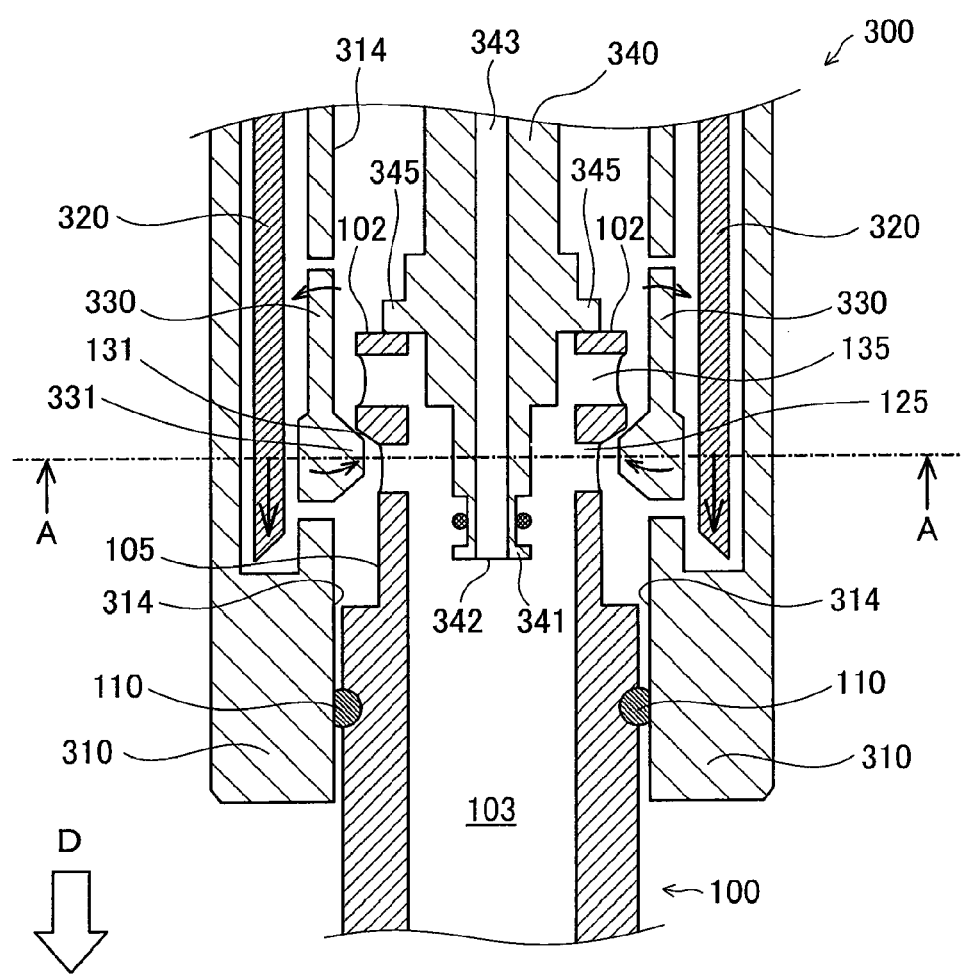
FIG. 6 illustrates the state that the gas filler nozzle is interlocked with the suction nozzle.

Referring to FIGS. 4 to 6, interlocking the gas filler nozzle 300 with the suction nozzle 100 is described. FIGS. 4 to 6 show the cross sectional structures of the gas filler nozzle 300 and the suction nozzle 100. The gas filler nozzle 300 is eventually interlocked with the suction nozzle 100 as shown in FIG. 6 through the sequential states of FIGS. 4 and 5.

FIG. 4 illustrates the state before interlocking the gas filler nozzle with the suction nozzle. In the state of FIG. 4, the suction nozzle 100 is located to face the gas filler nozzle 300. The gas filler nozzle 300 includes an outer tube section 310, a sleeve 320, lock pins 330, and an inner tube section 340. The outer tube section 310 is in a cylindrical shape and has an opening 311 on one end (lower end in FIG. 4) along its axial direction X2. The other end (upper end in FIG. 4, not shown) of the outer tube section 310 is a closed end. The outer tube section 310 at least partly has a multi-layered structure of an outer peripheral wall 313 and an inner peripheral wall 315 and includes a space 316 between the outer peripheral wall 313 and the inner peripheral wall 315. In other words, the outer tube section 310 has the outer peripheral wall 313 in the cylindrical shape, the inner peripheral wall 315 provided inside the outer peripheral wall 313, and the space 316 formed between the outer peripheral wall 313 and the inner peripheral wall 315. The cylindrical sleeve 320 is located in this space 316.

The sleeve 320 is a member to press and move the lock pins 330 and is provided to be movable in the axial direction X2 (vertical direction in FIG. 4). The sleeve 320 is moved by a drive unit 360, such as a motor, as the driving source. The lock pins 330 are members serving to lock the suction nozzle 100 or a receptacle. A plurality of (for example, six) the lock pins 330 are arranged at equal intervals along the circumferential direction of an inner periphery 314 of the outer tube section 310 and are located in the cut-out portions of the inner peripheral wall 315. Each of the lock pins 330 has a projection 331 protruded toward a central axis O of the outer tube section 310 and a back element 332 provided on the back face of the projection 331. The lock pin 330 swings when the back element 331 contacts with the sleeve 320, and the projection 331 moves toward the central axis O of the outer tube section 310. The projection 331 is accordingly protruded from the inner periphery 314 of the outer tube section 310.

The inner tube section 340 is in the cylindrical shape and is located inside the outer tube section 310, such that its central axis is identical with the central axis O of the outer tube section 310. The inner tube section 340 has a base end (not shown) fixed to the outer tube section 310 and a peripheral end 341 located to face the opening 311 of the outer tube section 310. The inner tube section 340 includes a supply port 342, a supply pipe 343, an O-ring 344 and an abutment element 345. The supply pipe 343 communicates with the outside via the supply port 342 formed on the peripheral end 341 of the inner tube section 340 and is connected with the supply hose 430 (FIG. 1) base end of the inner tube section 340. The gas filling device 30 releases the hydrogen gas, which is delivered from the storage tank 410 (FIG. 1), from the supply port 342.

The O-ring 344 is a circular seal member made of, for example, rubber or resin and is located on an outer periphery 346 close to the peripheral end 341. The O-ring 344 serves to seal the clearance between a receptacle of the fuel cell vehicle and the gas filler nozzle 300, which is interlocked with the receptacle, and thereby improve the gas tightness. The abutment element 345 is in a flange shape and is formed in the middle of the peripheral end 341 and the base end of the inner tube section 340. When the gas filler nozzle 300 is interlocked with the suction nozzle 100 or the receptacle, the abutment element 345 abuts against the peripheral end of the suction nozzle 100 or the receptacle.

FIG. 5 illustrates the state that the suction nozzle is inserted into the opening of the gas filler nozzle. In order to interlock the gas filler nozzle 300 with the suction nozzle 100, the peripheral end 102 of the suction nozzle 100 is inserted through the opening 311 of the gas filler nozzle 300, and the gas filler nozzle 300 is then moved in the direction of arrow D (downward in FIG. 5). The direction of arrow D is along the axial direction X1 and the axial direction X2 and causes the opening 311 of the gas filler nozzle 300 to approach to the base end 101 of the suction nozzle 100. When the gas filler nozzle 300 is moved in the direction of arrow D, the O-ring 110 abuts against the inner periphery 314 and slides on the inner periphery 314. The moisture adhering to the inner periphery 314 then relatively moves toward the small-diameter portion suction ports 125 by means of the O-ring 110. When the gas filler nozzle 300 is moved in the direction of arrow D, the peripheral end 341 of the inner tube section 340 is inserted through the opening 104 of the suction nozzle 100 into the hollow space 103.

FIG. 6 illustrates the state that the gas filler nozzle is interlocked with the suction nozzle. When the abutment element 345 of the inner tube section 340 abuts against the peripheral end 102 of the suction nozzle 100, the further motion of the gas filler nozzle 300 in the direction of arrow D is restricted. Such state that the suction nozzle 100 is pressed deep into the gas filler nozzle 300 is called the interlocked state that the gas filler nozzle 300 is interlocked with the suction nozzle 100. In this interlocked state, when the sleeve 320 is moved in the direction of arrow D by the drive unit 360, the projections 331 of the lock pins 330 are pressed inward in the gas filler nozzle 300 by the sleeve 320 and engage with the step 131 of the suction nozzle 100. Such engagement restricts the motion of the gas filler nozzle 300 in the opposite direction to the direction of arrow D (upward in FIG. 6). The gas filler nozzle 300 is thus not releasable from the suction nozzle 100. Hereinafter this state is called "locked state". On the contrary, the state that the gas filler nozzle 300 is releasable from the suction nozzle 100 is called "unlocked state".

As shown in FIG. 6, in the state that the gas filler nozzle 300 is interlocked with the suction nozzle 100, the outer periphery 105 of the suction nozzle 100 is opposed to the inner periphery 314 of the gas filler nozzle 300. The small-diameter portion suction ports 125 and the flange suction ports 135 of the suction nozzle 100 are configured to face the inner periphery 314 and the lock pins 330 of the gas filler nozzle 300 when the gas filler nozzle 300 is interlocked with the suction nozzle 100. More specifically, such configuration causes the both of distances in the axial direction X1 between the peripheral end 102 of the suction nozzle 100 and the distal ends of the small-diameter portion suction ports 125 and the flange suction ports 135 to be included in or approximate to the distance in the axial direction X2 between the abutment element 345 of the inner tube section 340 and the distal ends of the lock pins 330. This enables efficient suction of the moisture from the periphery of the lock pins 330, which are prone to accumulation of the moisture.

Figure 7:
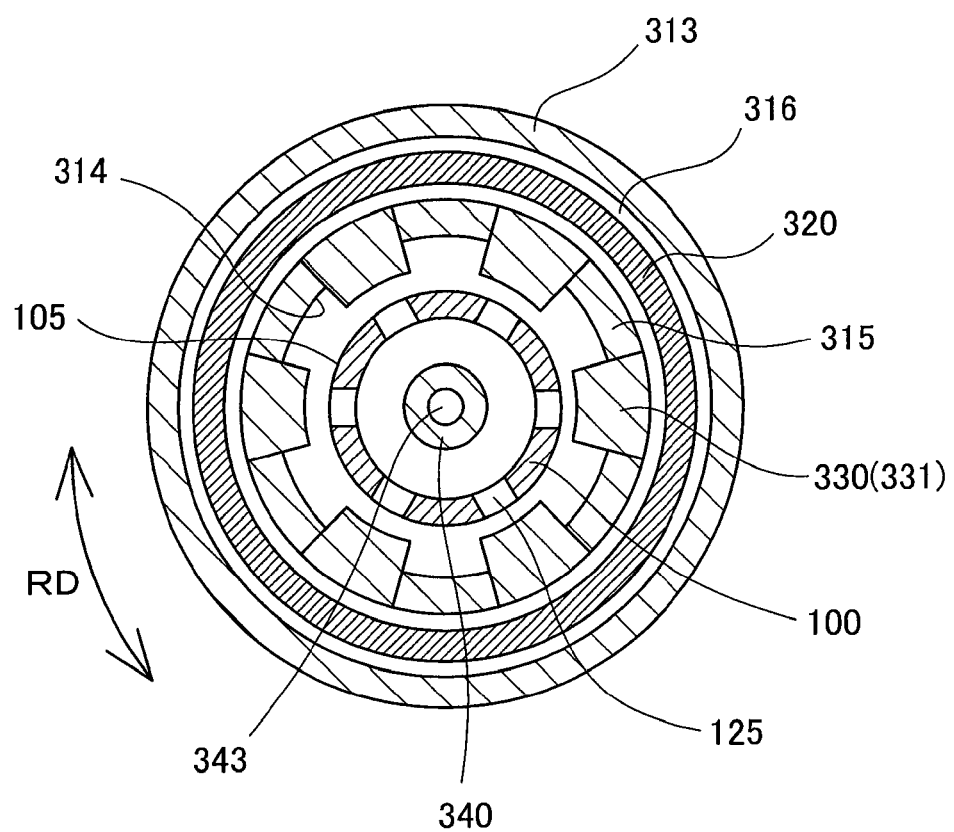
FIG. 7 illustrates the cross sectional structure in the state that the gas filler nozzle is interlocked with the suction nozzle.

FIG. 7 illustrates the cross sectional structure in the state that the gas filler nozzle is interlocked with the suction nozzle and is an A-A sectional view of FIG. 6. The small-diameter portion suction ports 125 are configured to face the projections 331 of the lock pins 330 when the gas filler nozzle 300 is interlocked with the suction nozzle 100. The positional relationship in a circumferential direction RD between the suction nozzle 100 and the gas filler nozzle 300 may be preset by any of various techniques. For example, the suction nozzle 100 and the gas filler nozzle 300 may be configured to have mating engagement elements configured to restrict the relative motion in the circumferential direction RD, so as to locate the suction nozzle 100 and the gas filler nozzle 300 according to the preset positional relationship. In one example, a groove extended in the axial direction X1 or X2 may be provided in one of the suction nozzle 100 and the gas filler nozzle 300, and a projection sliding on the groove may be provided on the other.

Figure 8:
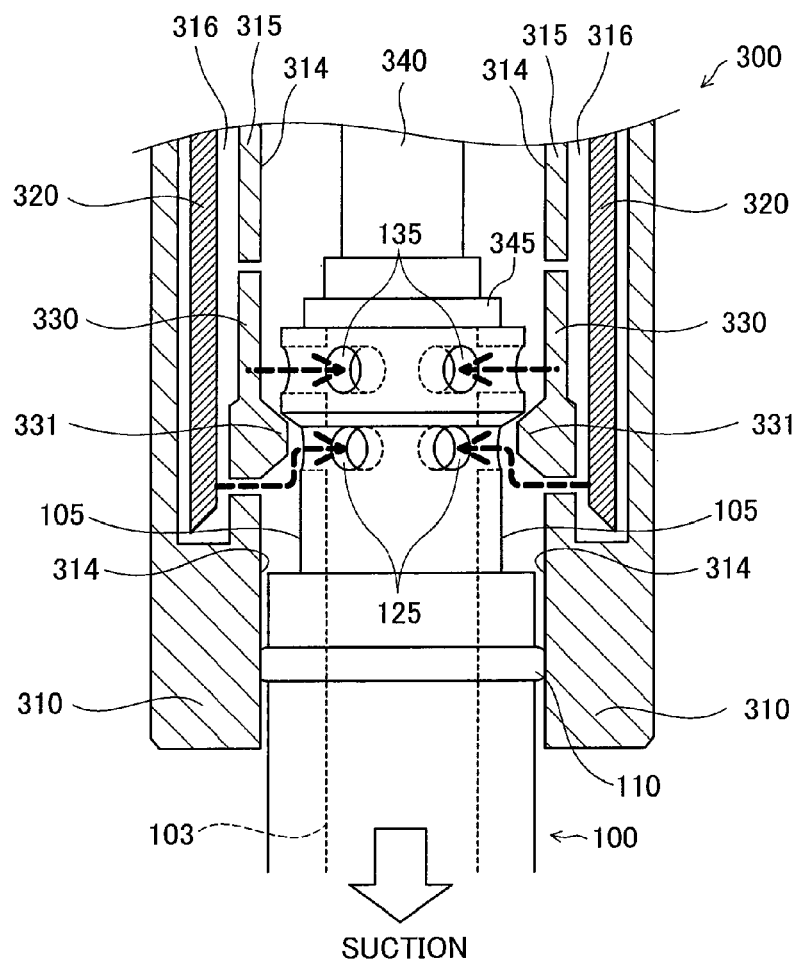
FIG. 8 illustrates the state that the suction nozzle sucks the inside of the gas filler nozzle.

FIG. 8 illustrates the state that the suction nozzle sucks the inside of the gas filler nozzle. As shown in FIG. 8, in the state that the gas filler nozzle 300 is interlocked with the suction nozzle 100, the suction device 10 (FIG. 2) drives the compressor 210 to suck the moisture inside of the gas filler nozzle 300 through the small-diameter portion suction ports 125 and the flange suction ports 135. More specifically, the suction device 10 sucks the moisture adhering to the inner periphery 314 and the lock pins 330 of the outer tube section 310, as well as the moisture accumulated in the space 316 of the outer tube section 310 and the moisture accumulated in between the outer periphery 105 of the suction nozzle 100 and the inner periphery 314 of the outer tube section 310. Especially in the locked state of the gas filler nozzle 300 to the suction nozzle 100, the suction device 10 can readily suck the moisture from the space 316 behind the lock pins 330. The moisture accumulated in between the outer periphery 105 and the inner periphery 314 includes the moisture moved by the O-ring 110 during insertion of the suction nozzle 100. The moisture sucked through the small-diameter portion suction ports 125 and the flange suction ports 135 are transported through the hollow space 103 toward the compressor 210. The suction by means of the suction device 10 substantially removes the moisture from the inside of the gas filler nozzle 300.

As described above, according to this embodiment, during non-use of the gas filling device 30, i.e., in the state except the supply of hydrogen gas, interlocking the gas filler nozzle 300 with the suction nozzle 100 enables the moisture inside of the gas filler nozzle 300 to be sucked. This advantageously prevents a potential failure or trouble due to freezing of the moisture in between the gas filler nozzle 300 and the receptacle of the fuel cell vehicle, when the gas filler nozzle 300 is used next time. The failure or trouble herein may be, for example, failed release of the gas filler nozzle 300 from the receptacle or difficulty in exchange of signals or information via a contact between the receptacle and the gas filler nozzle 300.

It is known that the gas filler nozzle 300 is prone to adhesion and accumulation of the moisture. Hydrogen gas supplied from the gas filler nozzle 300 is generally pre-cooled to around −20 to −40° C., which may result in cooling the gas filler nozzle 300 during supply of the hydrogen gas and cause dew condensation after the supply. Another cause is rainfall. According to this embodiment, however, the moisture inside of the gas filler nozzle 300 can be sucked and substantially removed by simply interlocking the gas filler nozzle 300 with the suction nozzle 100 before interlocking the gas filler nozzle 300 with the receptacle.

Nozzle purging of, e.g., nitrogen gas is the known technique to remove the substances adhering to the gas filler nozzle. The nozzle purging technique cannot, however, sufficiently remove the moisture adhering to the gas filler nozzle. Especially in the parts of the relatively complicated structures, such as the lock pins 330 and the space 316 shown in this embodiment, it is difficult to press out the moisture due to the large pressure loss. According to this embodiment, however, the suction nozzle 100 is structured to suck the moisture inside the gas filler nozzle 300 and thus ensures easy removal of the moisture inside of the gas filler nozzle 300.

Figure 9:
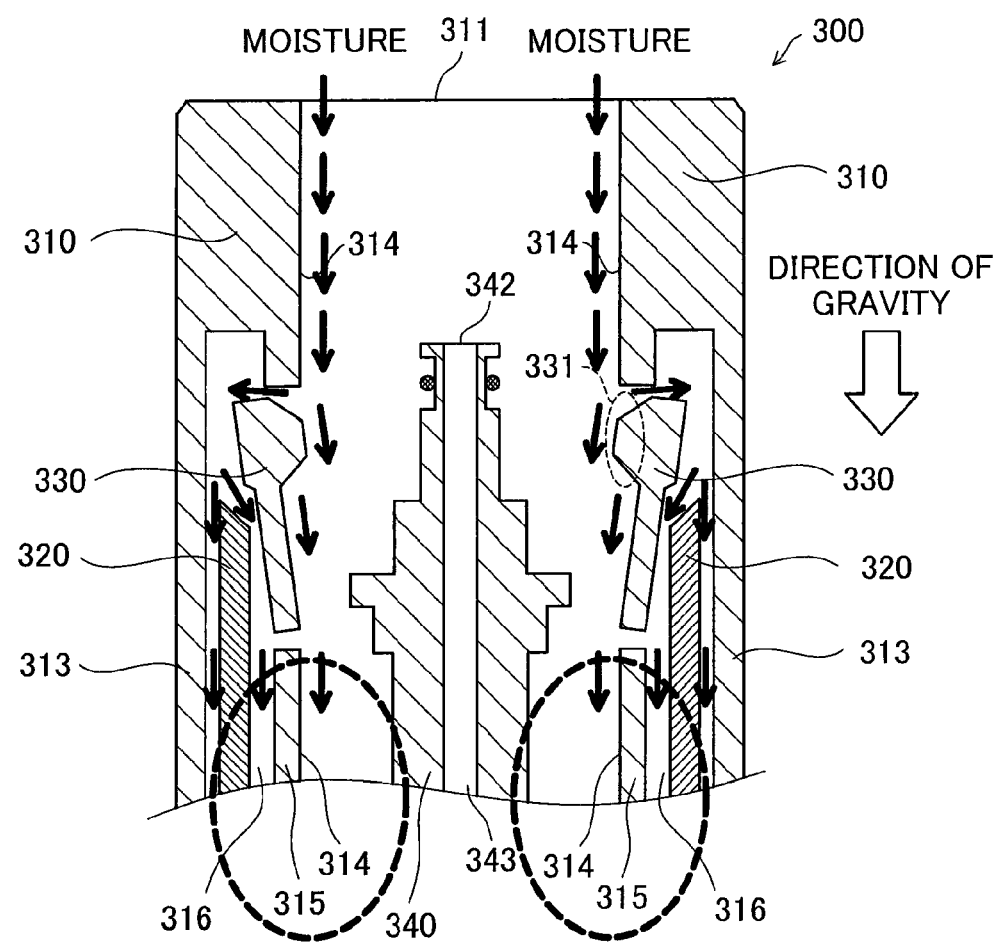
FIG. 9 illustrates the non-use state of the gas filler nozzle according to a prior art example.

FIG. 9 illustrates the non-use state of the gas filler nozzle according to a prior art example. Like the conventional fuel supply nozzle at the gas station, the gas filler nozzle 300 is generally fixed in the state facing upward from the horizontal direction. The rainfall is thus likely to enter inside the gas filler nozzle 300, so that the moisture due to the rainfall or dew condensation may easily enter the space 316. As shown by the broken lines, the moisture inside the gas filler nozzle 300 is likely to be accumulated in the depth of the gas filler nozzle 300 (lower side in FIG. 9). It is rather difficult to remove the moisture entering the space 316 and the moisture accumulated in the depth of the gas filler nozzle 300.

Figure 10:
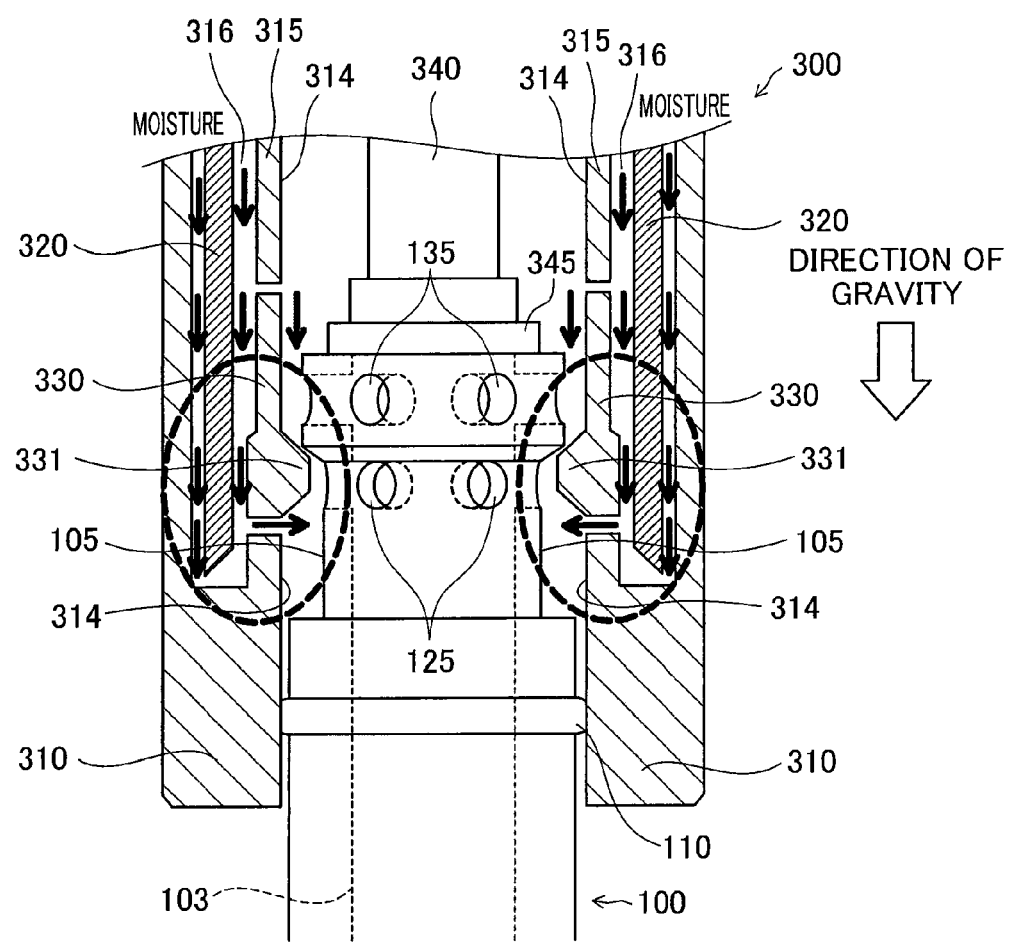
FIG. 10 illustrates the non-use state of the gas filler nozzle according to this embodiment.

FIG. 10 illustrates the non-use state of the gas filler nozzle according to this embodiment. In the suction device 10 of this embodiment, the peripheral end 102 of the suction nozzle 100 is directed upward from the horizontal direction, so that the gas filler nozzle 300 is fixed in the state that the opening 311 is directed downward from the horizontal direction. This prevents rainfall from entering inside the gas filler nozzle 300, while causing the moisture generated by dew condensation to move toward the opening 311 (downward in FIG. 10). The moisture moving toward the opening 311 is accumulated in the vicinity of the small-diameter portion suction ports 125 and the flange suction ports 135 as shown by the broken lines and is thus readily sucked by the suction device 10.

B. Second Embodiment

Figure 11:
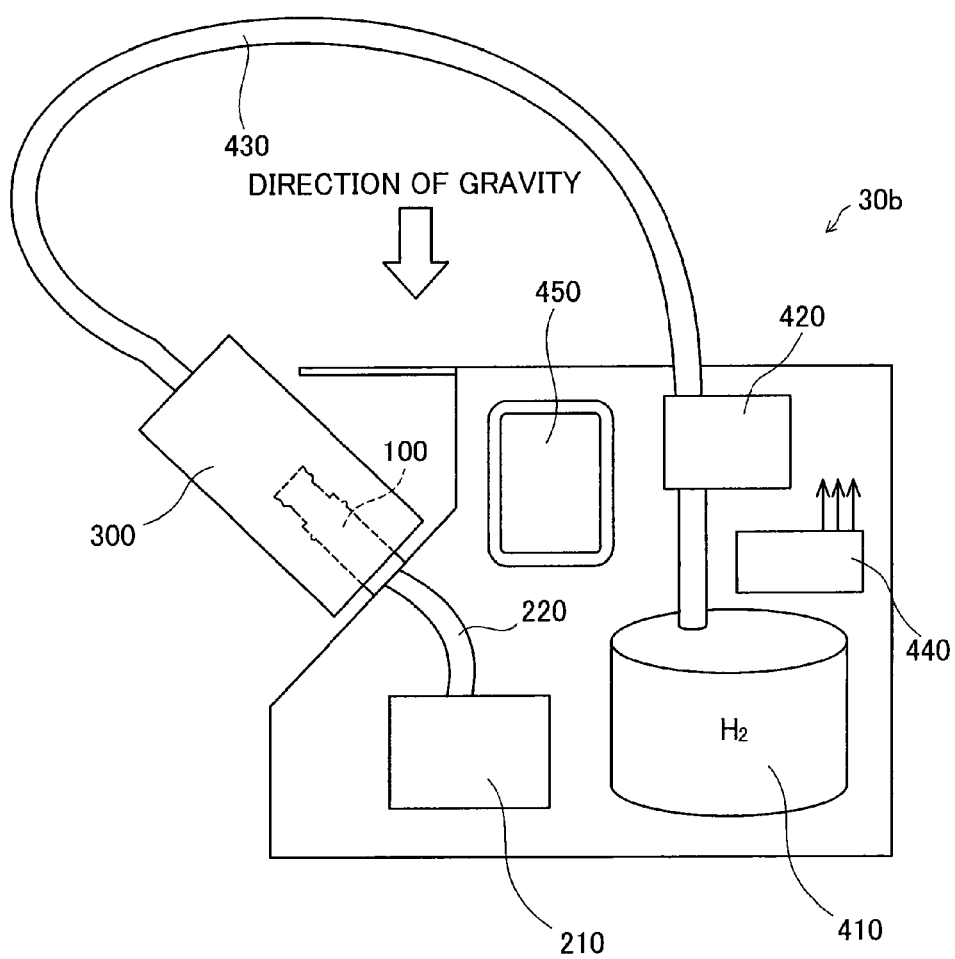
FIG. 11 illustrates the general configuration of a gas filling device according to a second embodiment.

FIG. 11 illustrates the general configuration of a gas filling device according to a second embodiment. The second embodiment describes suction of the moisture inside the gas filler nozzle 300 by a gas filling device 30b, instead of the suction device. The differences from the gas filling device 30 of the first embodiment (FIG. 2) are that the gas filling device 30b has the structure of the suction device 10 and is provided with an operation unit 450 used for information exchange with the user. The illustrated functional parts expressed by the same symbols as those of the first embodiment have the same functions as those described in the first embodiment.

The operation unit 450 may be implemented by, for example, a touch panel, and has the operational function of receiving the user's inputs, as well as the display function of displaying information to the user. The operation unit 450 is not restricted to the touch panel but may be a display screen or an operational button. The following describes the operations of the gas filling device 30b during supply of hydrogen gas to the fuel cell vehicle.

Figure 12:
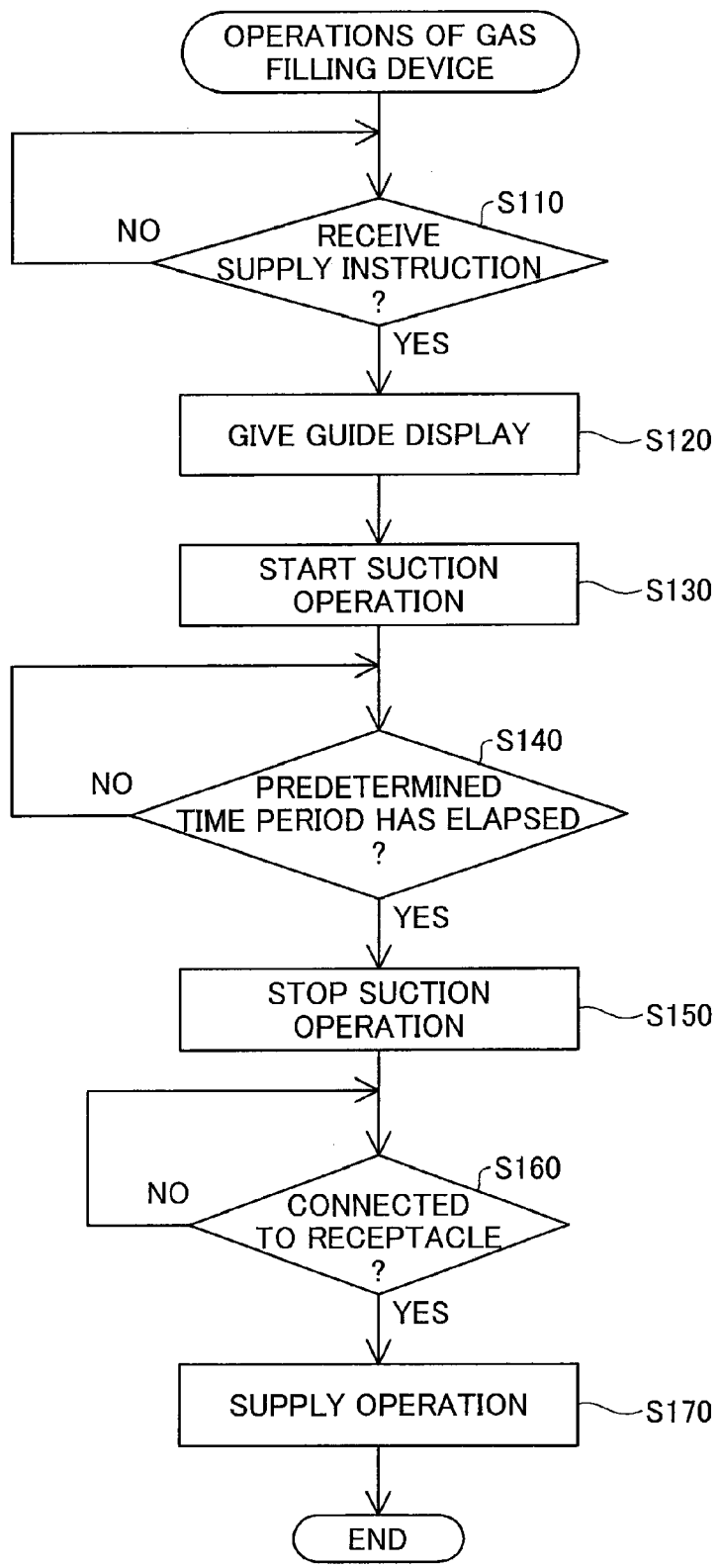
FIG. 12 shows the operation flow of the gas filling device.

FIG. 12 shows the operation flow of the gas filling device. The gas filling device 30b receives the user's instruction to supply the hydrogen gas and starts the operations for the supply (step S110: Yes). More specifically, a controller 440 of the gas filling device 30b receives a supply instruction from the operation unit 450 and controls the respective parts of the gas filling device 30b to start the supply operations.

The controller 440 controls the operation unit 450 to give a guide display to the user (step S120). The guide display informs the user of starting the suction operation for sucking the moisture inside the gas filler nozzle 300 prior to supply of hydrogen gas and may be, for example, a message like "now nozzle cleaning". A voice guidance may be provided, instead of or in addition to the guide display by the operation unit 450.

The controller 440 starts the suction operation after giving the guide display (step S130). More specifically, the controller 440 controls the compressor 210 to suck the moisture inside the gas filler nozzle 300 by the suction nozzle 100. The duration of the suction operation (suction time) may be set to any arbitrary time. The suction time is preferably about 30 seconds to 2 minutes. The suction time may be pre-stored, for example, in a storage device (not shown).

When the gas filler nozzle 300 and the suction nozzle 100 are in the unlocked state at the start of the suction operation, the gas filling device 30b locks the gas filler nozzle 300 and the suction nozzle 100 to the locked state before starting the suction operation. The gas filling device 30b may alternately repeat the locked state and the unlocked state during the suction operation. This enables the more effective suction of the moisture inside the gas filler nozzle 300.

When a predetermined time period has elapsed since the start of the suction operation (step S140: Yes), the controller 440 stops the suction operation (step S150) and unlocks the gas filler nozzle 300 and the suction nozzle 100 to the unlocked state. The user then releases the gas filler nozzle 300 from the suction nozzle 100 and connects the gas filler nozzle 300 to the receptacle of the vehicle.

When detecting the connection of the gas filler nozzle 300 to the receptacle of the vehicle (step S160: Yes), the controller 440 locks the gas filler nozzle 300 and the receptacle to the locked state and subsequently controls the valve 420 to start the supply of hydrogen gas (step S170). The controller 440 stops the supply operation when detecting, for example, that the hydrogen gas pressure or the temperature meets a predetermined condition. The controller 440 subsequently unlocks the gas filler nozzle 300 and the receptacle to the unlocked state. The user then releases the gas filler nozzle 300 from the receptacle and connects the gas filler nozzle 300 to the suction nozzle 100.

As described above, the gas filling device 30b has the enhanced convenience for sucking the moisture inside the gas filler nozzle. More specifically, when the gas filling device 30b, which is not being operated by the user, starts the suction operation, the user may mistakenly perceive the noise by the suction operation as the noise by leakage of hydrogen gas from the gas filler nozzle 300. Performing the suction operation during the user's operation of the gas filling device 30b, more specifically, immediately before the supply of hydrogen gas, effectively relieves the user's uneasiness. The gas filling device 30b according to this embodiment uses the operation unit 450 to give the guide display of the suction operation to the user immediately before execution of the suction operation, thus further relieving the user's uneasiness.

C. Third Embodiment

Figure 13:
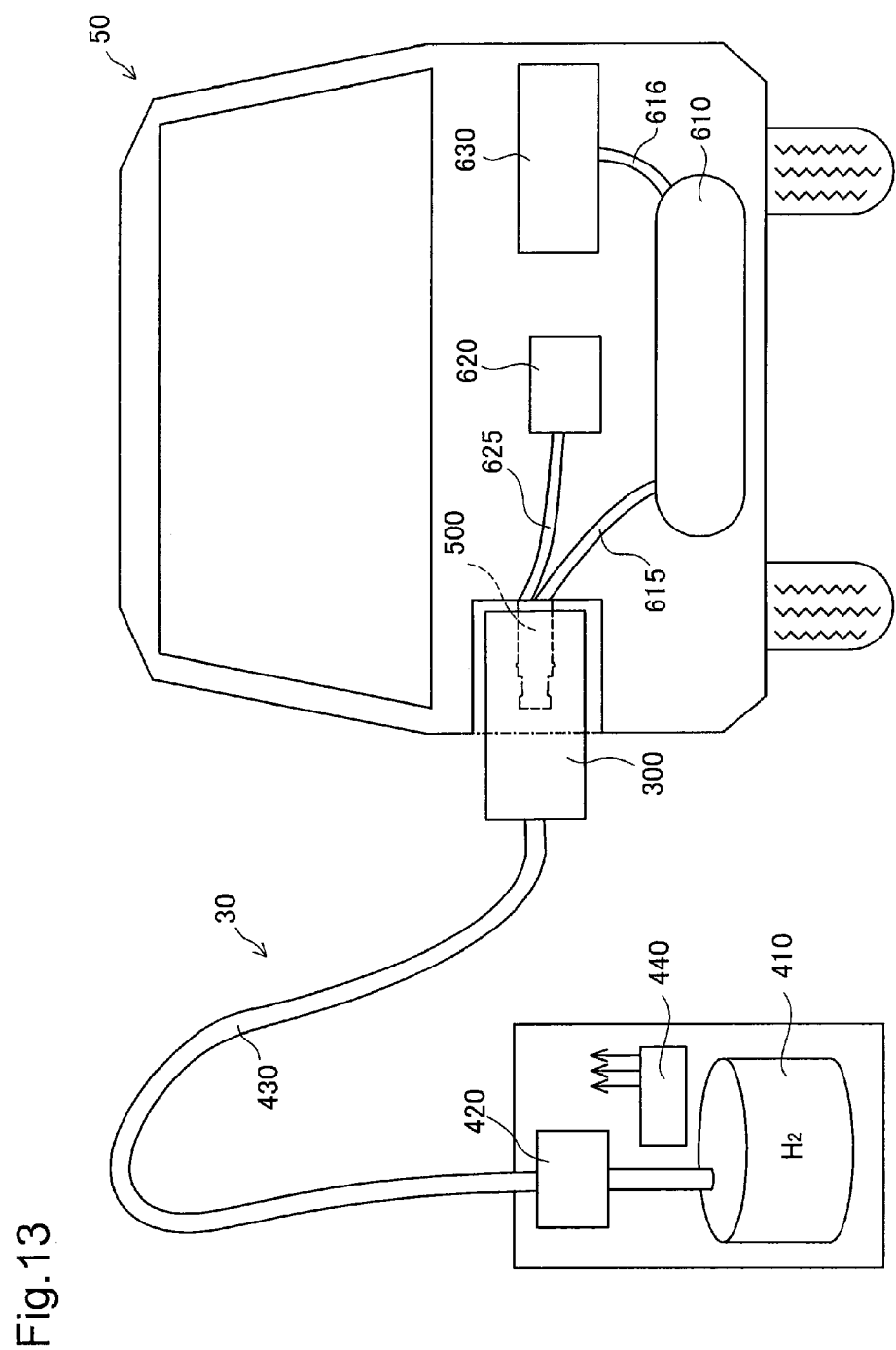
FIG. 13 illustrates the general configuration of a fuel cell vehicle according to a third embodiment.

FIG. 13 illustrates the general configuration of a fuel cell vehicle according to a third embodiment. The third embodiment describes suction of the moisture inside the gas filler nozzle 300 by a fuel cell vehicle 50, instead of the suction device or the gas filling device. The illustrated functional parts expressed by the same symbols as those of the first and second embodiments have the same functions as those described in the first and second embodiments.

The fuel cell vehicle 50 includes a receptacle 500, a vehicle tank 610, a compressor 620 and a fuel cell 630. The hydrogen gas is filled into the fuel cell vehicle 50 by interlocking the gas filler nozzle 300 of the gas filling device 30 with the receptacle 500. The hydrogen gas supplied via the receptacle 500 flows through a feed pipe 615 and is accumulated in the vehicle tank 610. The hydrogen gas accumulated in the vehicle tank 610 is supplied via a supply pipe 616 to the anodes of the fuel cell 630 and is used for power generation of the fuel cell 630. The fuel cell vehicle 50 drives a motor (not shown) with electric power by the power generation of the fuel cell 630 to output power. The receptacle 500 is also connected with the compressor 20 via a suction pipe 625. In the fuel cell vehicle 50, the compressor 620 is driven to give a suction force to a suction port formed at the receptacle 500 as described below.

Figure 14:
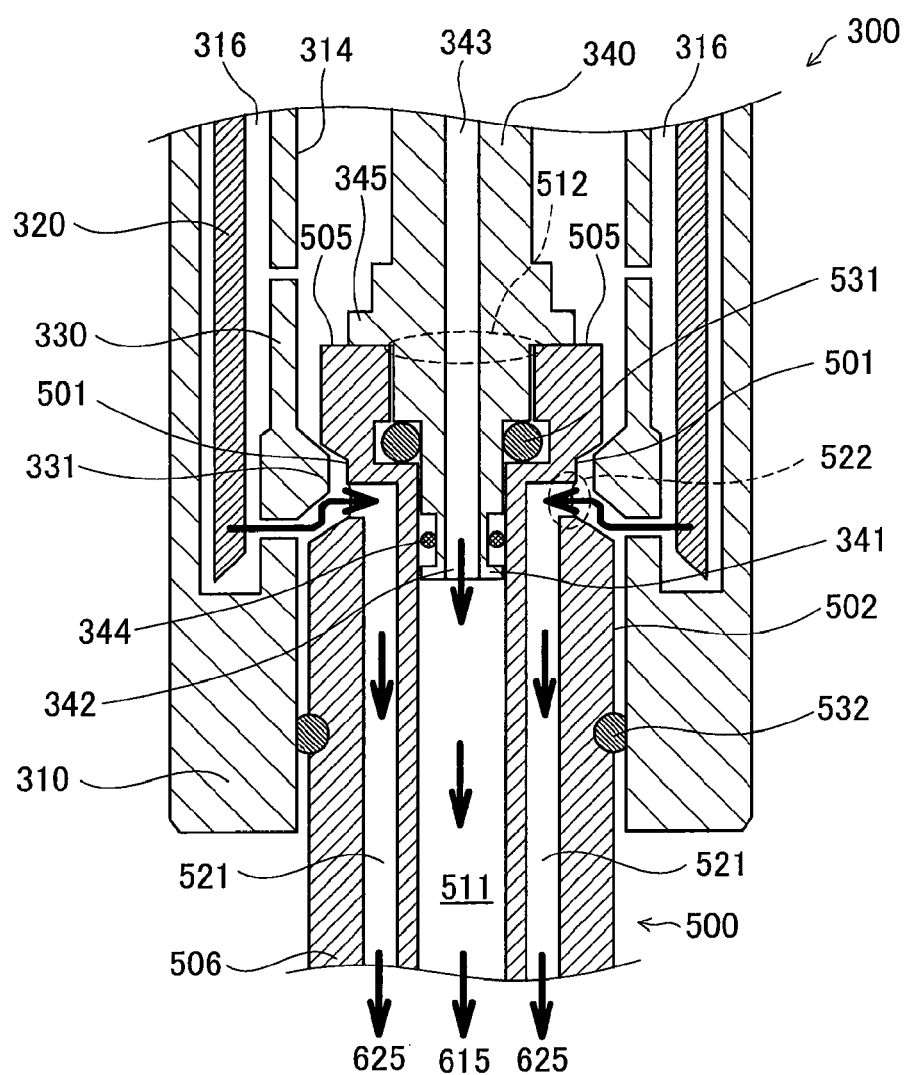
FIG. 14 illustrates the interlocked state that the gas filler nozzle is interlocked with the receptacle.

FIG. 14 illustrates the interlocked state that the gas filler nozzle is interlocked with the receptacle. The receptacle 500 includes a receiving pipe 511, an inlet 512, a suction pipe 521, and a suction port 522. The receptacle 500 is in a cylindrical shape and is made from a metal, such as stainless steel. The receptacle 500 has a small-diameter portion 510 provided on an outer periphery 502 to engage with the projections 331 of the lock pins 330.

The receiving pipe 511 is formed inside the receptacle 500 and has one end communicating with the outside via the inlet 512 provided at a peripheral end 505 of the receptacle 500 and the other end connected with the feed pipe 615 (FIG. 13) at a base end 506 of the receptacle 500. Like the receiving pipe 511, the suction pipe 521 is also formed inside the receptacle 500 and has one end communicating with the outside via the suction port 522 provided at the small-diameter portion 501 of the receptacle 500 and the other end connected with the suction pipe 625 (FIG. 13) at the base end 506 of the receptacle 500.

When the gas filler nozzle 300 is interlocked with the receptacle 500, the peripheral end 341 of the inner tube section 340 is inserted through the inlet 512 into the receiving pipe 511. An O-ring 531 provided on the receptacle 500 and the O-ring 344 of the inner tube section 340 serve to seal the clearance between the receiving pipe 511 and the inner tube section 340, which is fit into the receiving pipe 511, and thereby improve the gas tightness. The hydrogen gas supplied from the gas filling device 30 flows through the supply pipe 343 and the receiving pipe 511, which communicate with each other, and is accumulated in the vehicle tank 610 (FIG. 13).

After the gas filler nozzle 300 is interlocked with the receptacle 500, the fuel cell vehicle 50 starts the suction operation before receiving the supply of hydrogen gas from the gas filling device 30. The fuel cell vehicle 50 starts the suction operation, in response to detection of interlocking the gas filler nozzle 300 with the receptacle 500. The fuel cell vehicle 50 may start the suction operation in response to the user's operation. In the configuration that both the fuel cell vehicle 50 and the gas filling device 30 have communication units for information exchange, the fuel cell vehicle 50 may start the suction operation when receiving a preset signal from the gas filling device 30.

The fuel cell vehicle 50 sucks the moisture inside the gas filler nozzle 300 via the suction port 522. The receptacle 500 of this embodiment has the suction port 522 provided at the small-diameter portion 501, so as to suck the moisture adhering to the inner periphery 314 and the lock pins 330 of the gas filler nozzle 300, as well as the moisture accumulated in the space 316 of the outer tube section 310 and the moisture accumulated in between the outer periphery 502 of the receptacle 500 and the inner periphery 314 of the outer tube section 310. The moisture sucked through the suction port 522 is transported via the suction pipe 521 toward the compressor 620 (FIG. 13). The fuel cell vehicle 50 continues this suction operation for a predetermined time period.

On completion of the suction operation by the fuel cell vehicle 50, the gas filling device 30 starts supplying the hydrogen gas to the fuel cell vehicle 50. According to other embodiments, the gas filling device 30 may start such supply operation when receiving a preset signal from the fuel cell vehicle, which has completed the suction operation, or may start the supply operation in response to the user's operation. The suction operation of the fuel cell vehicle 50 may be performed in parallel with the supply operation of the gas filling device 30.

As described above, the suction operation for sucking the moisture inside the gas filler nozzle 300 is not limited to the suction device or the gas filling device but may be performed by the gas consuming device, for example, the fuel cell vehicle. This prevents the moisture from being frozen in between the gas filler nozzle 300 and the receptacle 500 even when an existing gas filling device is used to fill the hydrogen gas. Additionally, the structure of the embodiment does not require the gas filler nozzle 300 to be detached during the time period between the suction of the moisture inside the gas filler nozzle 300 and the start of the supply of hydrogen gas. This reduces a potential trouble, such as dew re-condensation, due to exposure of the inside of the gas filler nozzle 300 to the outside air after the suction.

D. Fourth Embodiment

Figure 15:
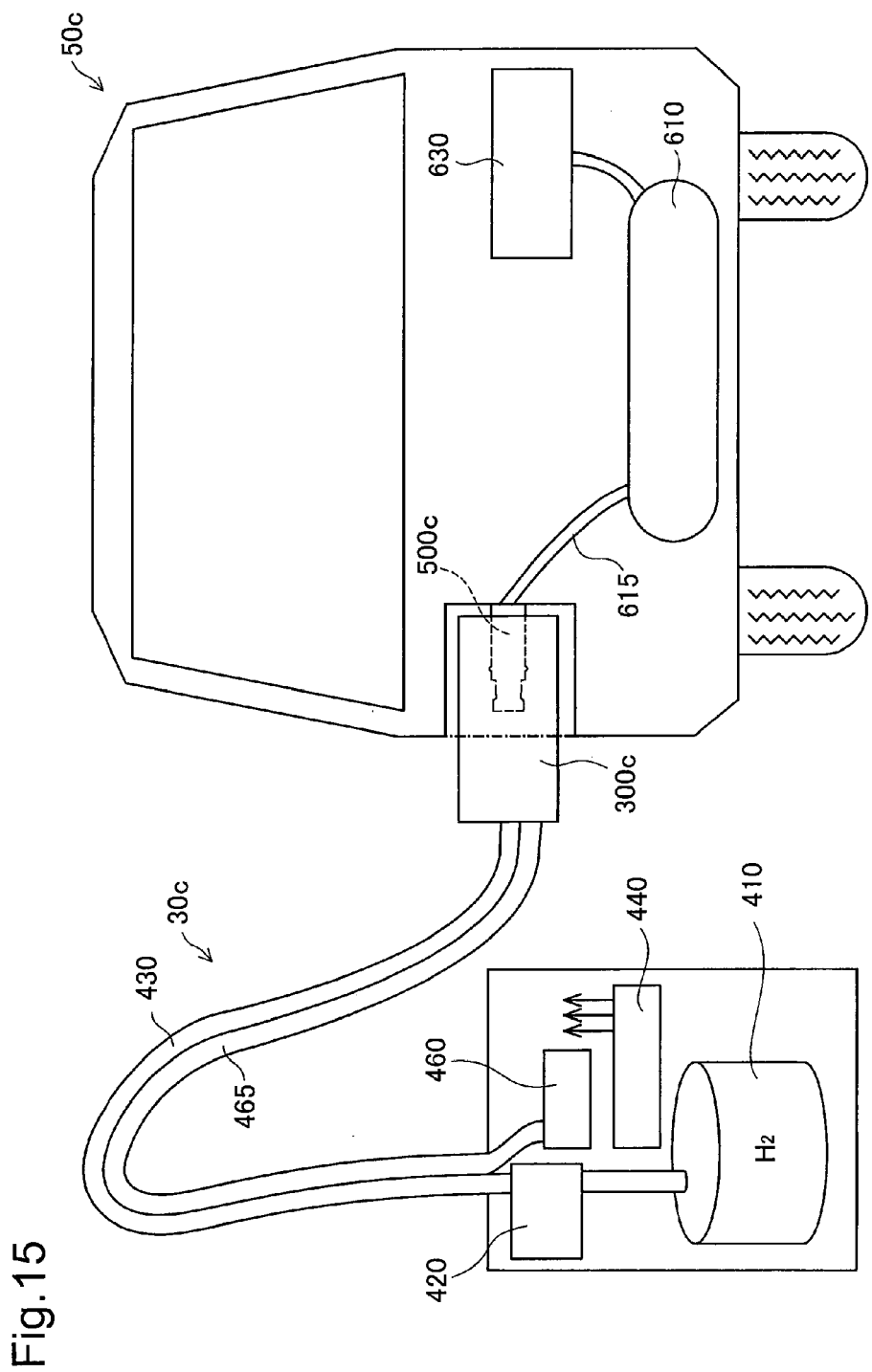
FIG. 15 illustrates the general configuration of a gas filling device according to a fourth embodiment.

FIG. 15 illustrates the general configuration of a gas filling device according to a fourth embodiment. The fourth embodiment describes suction of the moisture inside a gas filler nozzle 300c by the gas filler nozzle 300c itself. The differences from the gas filling device 30 of the first embodiment (FIG. 2) are that a gas filling device 30c has a gas filler nozzle of different structure and is provided with a compressor 460 and a suction hose 465. The illustrated functional parts expressed by the same symbols as those of the first to third embodiments have the same functions as those described in the first to third embodiments.

The gas filling device 30c includes a gas filler nozzle 300c, a storage tank 410, a valve 420, a supply hose 430, a controller 440, a compressor 460 and a suction hose 465. The compressor 460 is connected with the gas filler nozzle 300c via the suction hose 465. The gas filling device 30c drives the compressor 460 to give a suction force to a suction port formed at the gas filler nozzle 300c as described below. The fuel cell vehicle 50c represents a conventional fuel cell vehicle and includes a receptacle 500c, a vehicle tank 610, a compressor 620 and a fuel cell 630.

Figure 16:
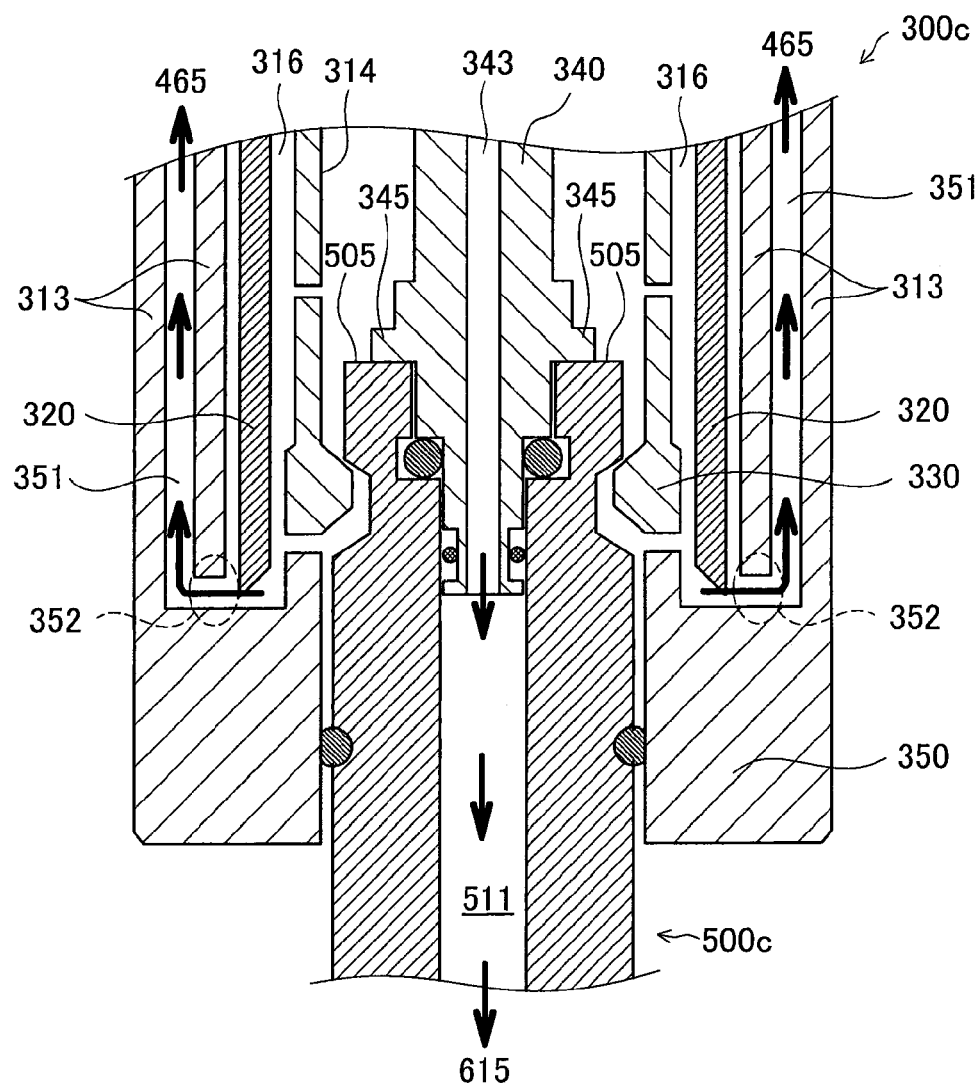
FIG. 16 illustrates the interlocked state that the gas filler nozzle is interlocked with the receptacle.

FIG. 16 illustrates the interlocked state that the gas filler nozzle is interlocked with the receptacle. The gas filler nozzle 300c includes an outer tube section 350, a sleeve 320, lock pins 330 and an inner tube section 340. The difference from the outer tube section 310 of the first embodiment (FIG. 4) is that the outer tube section 350 has a suction passage 351 formed inside the outer peripheral wall 313. The suction passage 351 has one end communicating with the space 316 via a suction port 352 and the other end connected with the suction hose 465 (FIG. 15). The suction passage 351 may be one or a plurality of conduits or may be a cylindrical cavity formed along the space 316.

The gas filling device 30c starts the suction operation prior to supply of the hydrogen gas, in response to detection of interlocking the gas filler nozzle 300c with the receptacle 500c. The gas filling device 30c may start the suction operation in response to the user's operation. In the configuration that both the fuel cell vehicle 50 and the gas filling device 30 have communication units for information exchange, the gas filling device 30c may start the suction operation when receiving a preset signal from the fuel cell vehicle 50.

The gas filling device 30c sucks the moisture inside the gas filler nozzle 300c via the suction port 352. The gas filler nozzle 300c of the embodiment is structured to have the suction port 352 communicating with the space 316, so as to suck the moisture adhering to the inner periphery 314 and the lock pins 330 of the gas filler nozzle 300c, as well as the moisture accumulated in the space 316 of the outer tube section 310 and the moisture accumulated in between the outer periphery 502 of the receptacle 500c and the inner periphery 314 of the outer tube section 310. The moisture sucked through the suction port 352 is transported via the suction passage 351 toward the compressor 460 (FIG. 15). The gas filling device 30c continues this suction operation for a predetermined time period. After completion of the suction operation, the gas filling device 30c starts supplying hydrogen gas to the fuel cell 50. The gas filling device 30c may perform the supply operation in parallel with the suction operation.

As described above, the suction port configured to suck the moisture inside the gas filler nozzle 300c may be provided on the gas filler nozzle 300c itself of the gas filling device, instead of the suction nozzle or the receptacle. This prevents the moisture from being frozen in between the gas filler nozzle 300c and the receptacle 500c even when hydrogen gas is filled into the conventional fuel cell vehicle. Additionally, the structure of the embodiment does not require the gas filler nozzle 300c to be detached during the time period between the suction of the moisture inside the gas filler nozzle 300c and the start of the supply of hydrogen gas. This reduces a potential trouble, such as dew re-condensation, due to exposure of the inside of the gas filler nozzle 300c to the outside air after the suction.

E. Modifications

The foregoing has described the invention in detail with reference to the illustrative embodiments. The invention is, however, not limited to the above embodiments, but a multiplicity of variants and modifications may be made to the embodiments without departing from the scope of the invention. Some examples of possible modifications are described below.

E1. Modification 1

Figure 17:
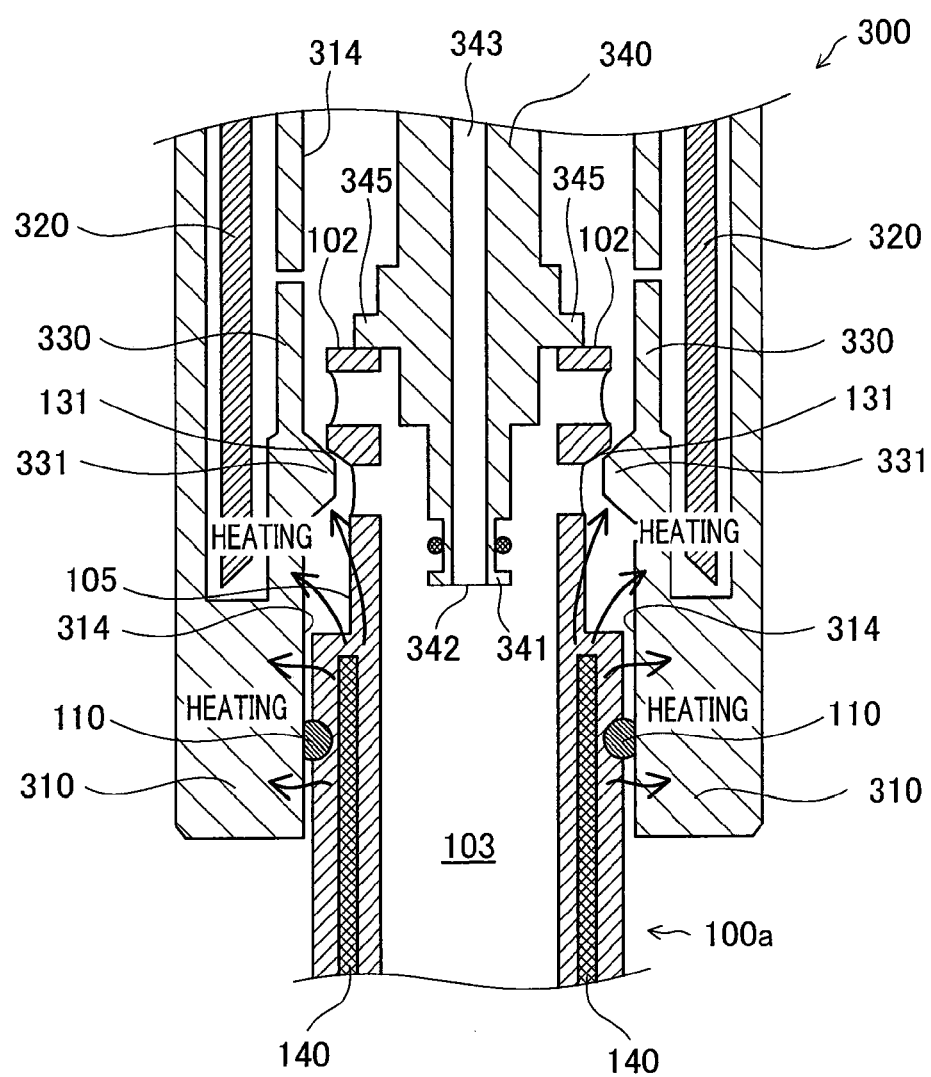
FIG. 17 illustrates the general structure of a suction nozzle according to Modification 1.

FIG. 17 illustrates the general structure of a suction nozzle according to Modification 1. The difference from the suction nozzle 100 of the first embodiment (FIG. 6) is that a suction nozzle 100a of Modification 1 has a heating body 140. In the state that the gas filler nozzle 300 is interlocked with the suction nozzle 100a, the heating body 140 serves to heat the gas filler nozzle 300, so as to suck and dry the moisture inside the gas filler nozzle 300. The heating body 140 can raise the temperature of the gas filler nozzle 300, which has been cooled during the previous use. This effectively prevents dew condensation during the current use, even when the inside of the gas filler nozzle 300 is exposed to the outside air during the time period between removal of the gas filler nozzle 300 from the suction nozzle 100a and attachment of the gas filler nozzle 300 to the receptacle.

E2. Modification 2

Figure 18:
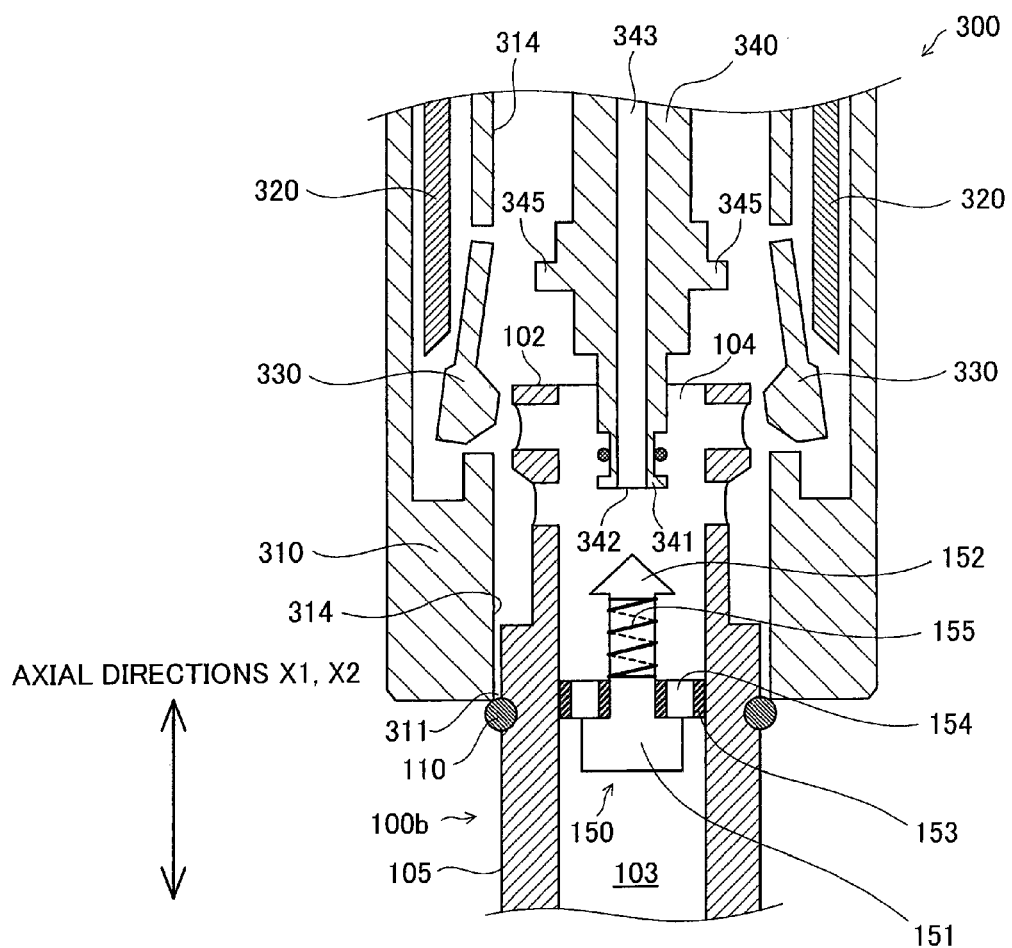
FIG. 18 illustrates the general structure of a suction nozzle according to Modification 2.

FIG. 18 illustrates the general structure of a suction nozzle according to Modification 2. The difference from the suction nozzle 100 of the first embodiment (FIG. 5) is that a suction nozzle 100b of Modification 2 has a sealing member 150. In the state that the gas filler nozzle 300 is interlocked with the suction nozzle 100b, the sealing member 150 serves to seal the supply port 342. The sealing member 150 includes a valve body 151, a support element 153 and a spring 155. The valve body 151 is an elongated member with a peripheral end 152 to close the supply port 342. The valve body 151 is arranged to have its longitudinal direction along the axial directions X1 and X2 and is supported by the support element 153 to be slidable in the axial directions X1 and X2. The support element 153 is fixed to the inner periphery of the hollow space 103. The support element 153 has an aeration element 154 to ensure the aeration of the hollow space 103. The spring 155 is located between the peripheral end 152 of the valve body 151 and the support element 153 to press the peripheral end 152 upward.

Figure 19:
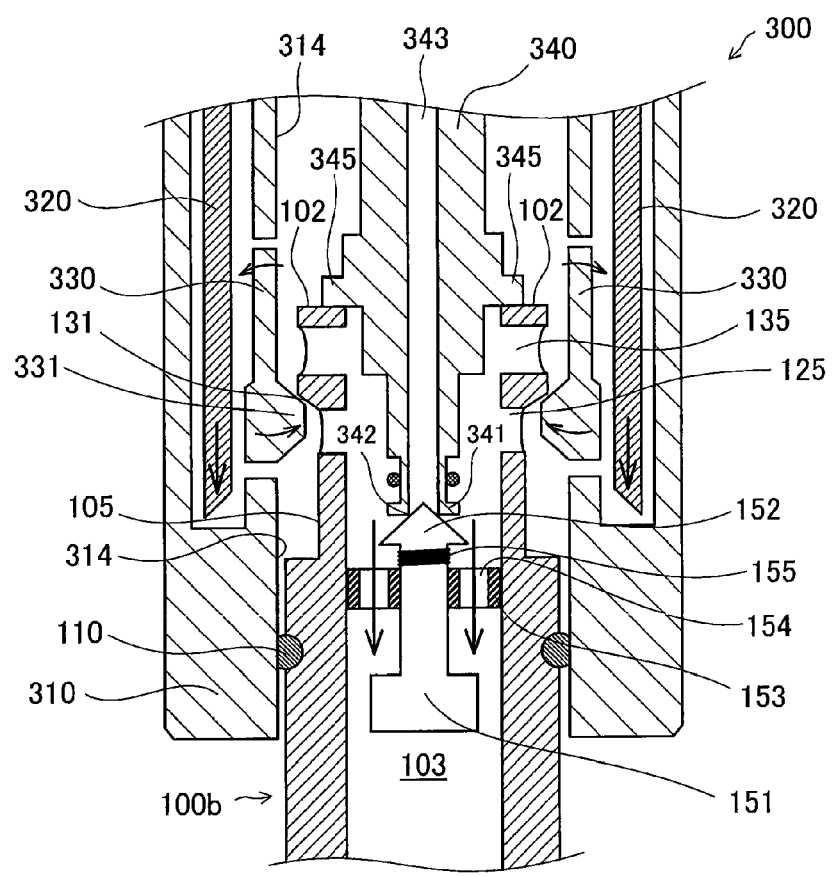
FIG. 19 illustrates the state that the gas filler nozzle is interlocked with the suction nozzle according to Modification 2.

FIG. 19 illustrates the state that the gas filler nozzle is interlocked with the suction nozzle according to Modification 2 and corresponds to FIG. 6 of the first embodiment. When the suction nozzle 100b is interlocked with the gas filler nozzle 300, the peripheral end 341 of the inner tube section 340 presses down the valve body 151 against the force of the spring 155. The supply port 342 is accordingly pressed with a preset force by the peripheral end 152 of the valve body 151. This enhances the gas tightness between the supply port 342 and the peripheral end 152 of the valve body 151. In the state that the suction nozzle 100b is interlocked with the gas filler nozzle 300, the sealing member 150 seals the supply port 342. This enhances the suction force through the small-diameter portion suction ports 125 and the flange suction ports 135, while reducing suction of hydrogen gas through the supply pipe 343.

E3. Modification 3

Figure 20:
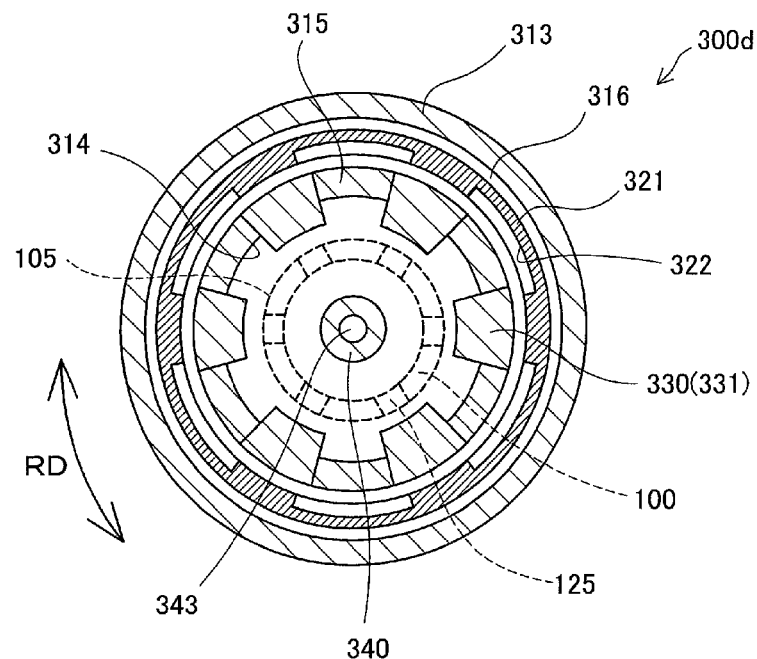
FIG. 20 illustrates the cross sectional structure of a gas filler nozzle according to Modification 3.

FIG. 20 illustrates the cross sectional structure of a gas filler nozzle according to Modification 3 and corresponds to FIG. 7 of the first embodiment. While the gas filler nozzle 300 of the first embodiment has the sleeve 320, a gas filler nozzle 300d of Modification 3 has a different shape of sleeve. A sleeve 321 of Modification 3 has a plurality of grooves 322 on the face opposed to the inner peripheral wall 315. The respective grooves 322 are extended in the direction along the axial direction X2 of the gas filler nozzle 300d and form flow paths to allow for the flow of the sucked moisture and the air between the inner peripheral wall 315 and the sleeve 321. This enables the moisture accumulated in the space 316 to be readily sucked.

E4. Modification 4

Figure 21:
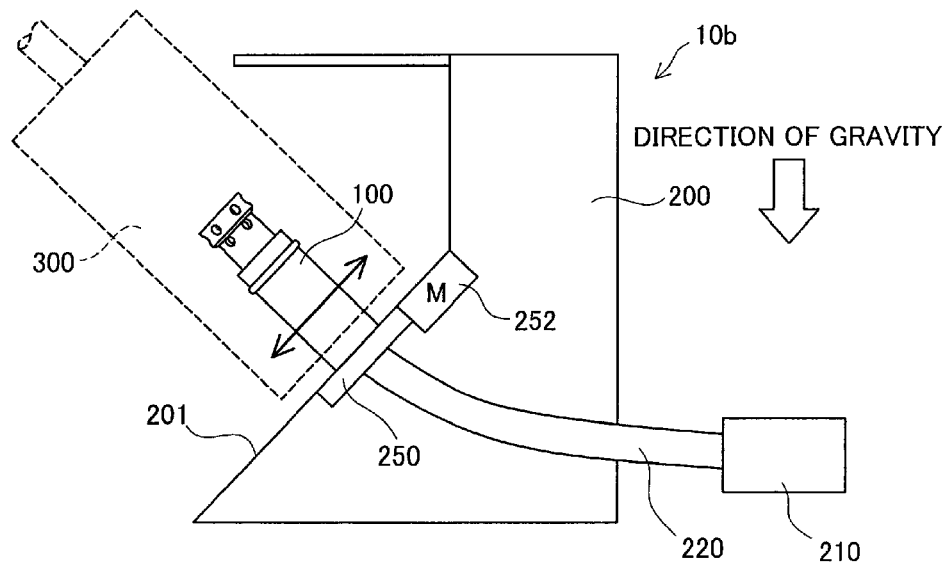
FIG. 21 illustrates the general configuration of a suction device according to Modification 4.

FIG. 21 illustrates the general configuration of a suction device according to Modification 4. The difference from the suction device 10 of the first embodiment (FIG. 1) is that a suction device 10b of Modification 4 has a vibration mechanism 250. The vibration mechanism 250 is structured to include a motor 252 and vibrates the suction nozzle 100 in the direction along the inclined surface 201. The suction device 10b drives the vibration mechanism 250 and the compressor 210 in the state that the gas filler nozzle 300 is interlocked with the suction nozzle 100. The suction device 10b accordingly sucks the moisture inside the gas filler nozzle 300, while vibrating the suction nozzle 100. Vibrating the suction nozzle 100 accelerates the motion of the moisture inside the gas filler nozzle 300, thus facilitating suction of the moisture.

E5. Modification 5

According to the first embodiment, the suction nozzle 100 has the peripheral end 102 arranged to be directed upward from the horizontal direction. The peripheral end 102 of the suction nozzle 100 may be directed in the horizontal direction or may be directed downward from the horizontal direction. In these cases, the suction nozzle 100 can suck the moisture inside the gas filler nozzle 300, thus preventing a potential failure or trouble due to freezing of the moisture in between the gas filler nozzle and the receptacle. Directing the peripheral end 102 of the gas filler nozzle 300 upward from the horizontal direction is preferable to more effectively suck the moisture inside the gas filler nozzle 300.

E6. Modification 6

In the embodiments described above, the suction nozzle 100 has two different types of suction ports, i.e., the small-diameter suction ports 125 and the flange suction ports 135. The suction nozzle 100 may have only one type of suction ports with omission of the other type of suction ports, or may have a further different type of suction ports in addition to these two types of suction ports.

E7. Modification 7

In the embodiments described above, the suction operation is performed in the locked state of the gas filler nozzle 300 with the suction nozzle 100. The suction operation may alternatively be performed in the unlocked state. The suction nozzle 100 of the embodiment can sufficiently suck the moisture inside the gas filler nozzle without any locking mechanism.

E8. Modification 8

The third embodiment and the fourth embodiment describe the fuel cell vehicle 50 as one example of the gas supply object. The invention is also applicable to any of various gas supply objects other than the vehicle, for example, a stationary fuel cell system.

E9. Modification 9

As clearly understood from the description of the third embodiment and the fourth embodiment, in the gas filling system configured to include the gas filling device and the fuel cell vehicle, at least one of the gas filler nozzle and the receptacle is required to have the suction ports configured to suck the moisture inside the gas filler nozzle. Additionally, at least one of the gas filling device and the fuel cell vehicle is required to have a compressor configured to give the suction force to the suction ports. This advantageously prevents a potential failure or trouble due to freezing of the moisture in between the gas filler nozzle and the receptacle.

E10. Modification 10

The present invention may be actualized by adequate combinations of the embodiments and modifications described above. For example, the invention may be applied to a gas filling system configured to include the gas filling device 30b according to the second embodiment (FIG. 11) and the fuel cell vehicle 50 according to the third embodiment (FIG. 13). In another example, the invention may be applied to a receptacle with a heating body as the combination of the fuel cell vehicle 50 according to the third embodiment (FIG. 13) and the suction nozzle of Modification 1.

DESCRIPTION OF NUMBERS

10, 10*b*: suction device
30, 30*b*, 30*c*: gas filling device
50, 50*c*: fuel cell vehicle
100, 100*a*, 100*b*: suction nozzle
101: base end
102: peripheral end
103: hollow space
104: opening
105: outer periphery
110 . . . O-ring
121: step
123: small-diameter portion
125: small-diameter portion suction ports
130: flange
131: inclined step
135: flange suction ports
140: heating body
150: sealing member
151: valve body
152: peripheral end
153: support element
154: aeration element
155: spring
200: nozzle support base
201: inclined surface
210: compressor
220: suction pipe
250: vibration mechanism
252: motor
300, 300*c*, 300*d*: gas filler nozzle
310: outer tube section
311: opening
313: outer peripheral wall
314: inner periphery
315: inner peripheral wall
316: space
320, 321: sleeve
322: groove
330: lock pins
331: projections
332: back element
340: inner tube section
341: peripheral end
342: supply port
343: supply pipe
344: O-ring
345: abutment element
346: outer periphery
350: outer tube section
351: suction passage
352: suction port
360: drive unit
410: storage tank
420: valve
430: supply hose
440: controller
450: operation unit
460: compressor
465: suction hose
500, 500*c*: receptacle
501: small-diameter portion
502: outer periphery
505: peripheral end
506: base end
511: receiving pipe
512: inlet
521: suction pipe
522: suction port
531: O-ring
610: vehicle tank
615: feed pipe
616: supply pipe
620: compressor
625: suction pipe
630: fuel cell

The invention claimed is:

1. A gas filling system, comprising:
a suction nozzle having a tip-side portion configured to be interlocked with a gas filler nozzle, the gas filler nozzle being to be used to supply a gas to a gas consuming device the suction nozzle having a base-side portion connected with a suction mechanism, the base-side portion is the opposite side of the tip-side portion, comprising:
a suction port provided in the tip-side portion and configured to suck moisture inside the gas filler nozzle by suction force given by the suction mechanism when the suction nozzle is interlocked with the gas filler nozzle;
wherein
the suction nozzle has a cylindrical outer shape for positioning within an opening of the gas filler nozzle, so as to be interlocked with the gas filler nozzle,
an outer periphery of the suction nozzle is opposed to an inner periphery of the gas filler nozzle when the suction nozzle is interlocked with the gas filler nozzle, and
the suction port is formed in the outer periphery.

2. The gas filling system according to claim 1, wherein the suction port is provided at a position opposed to a locking member that is provided on the inner periphery of the gas filler nozzle to lock the suction nozzle when the suction nozzle is interlocked with the gas filler nozzle.

3. The gas filling system according to claim 1, further comprising:
a circular seal member provided on the outer periphery, wherein the seal member slides on the inner periphery of the gas filler nozzle when the suction nozzle is being inserted into the opening of the gas filler nozzle, and thereby moves moisture adhering to the inner periphery relatively toward the suction port.

4. The gas filling system according to claim 1, further comprising:
a heating body configured to heat the gas filler nozzle when the suction nozzle is interlocked with the gas filler nozzle.

5. The gas filling system according to claim 1, further comprising:
a sealing member provided to seal a gas supply port of the gas filler nozzle when the suction nozzle is interlocked with the gas filler nozzle.

6. A suction device configured to suck moisture inside a gas filler nozzle, comprising:
a suction nozzle having a tip-side portion configured to be interlocked with a gas filler nozzle, the gas filler nozzle being to be used to supply a gas to a gas consuming device the suction nozzle having a base-side portion connected with a suction mechanism, the base-side portion is the opposite side of the tip-side portion, comprising:

a suction port provided in the tip-side portion and configured to suck moisture inside the gas filler nozzle by suction force given by the suction mechanism when the suction nozzle is interlocked with the gas filler nozzle; wherein the suction nozzle has a cylindrical outer shape for positioning within an opening of the gas filler nozzle, so as to be interlocked with the gas filler nozzle, an outer periphery of the suction nozzle is opposed to an inner periphery of the gas filler nozzle when the suction nozzle is interlocked with the gas filler nozzle, and the suction port is formed in the outer periphery; and a support base configured to support the suction nozzle,
wherein the suction nozzle is attached to the support base such that a distal end of the suction nozzle is directed upward from a horizontal direction.

7. The suction device according to claim 6, further comprising:

a vibration mechanism configured to vibrate the suction nozzle when the suction nozzle is interlocked with the gas filler nozzle.

8. A gas filling device configured to supply a gas to a gas consuming device, comprising:

a suction nozzle having a tip-side portion configured to be interlocked with a gas filler nozzle, the gas filler nozzle being to be used to supply a gas to a gas consuming device the suction nozzle having a base-side portion connected with a suction mechanism, the base-side portion is the opposite side of the tip-side portion, comprising:

a suction port provided in the tip-side portion and configured to suck moisture inside the gas filler nozzle by suction force given by the suction mechanism when the suction nozzle is interlocked with the gas filler nozzle; wherein the suction nozzle has a cylindrical outer shape for positioning within an opening of the gas filler nozzle, so as to be interlocked with the gas filler nozzle, an outer periphery of the suction nozzle is opposed to an inner periphery of the gas filler nozzle when the suction nozzle is interlocked with the gas filler nozzle, and the suction port is formed in the outer periphery the suction port is provided at a position opposed to a locking member that is provided on the inner periphery of the gas filler nozzle to lock the suction nozzle when the suction nozzle is interlocked with the gas filler nozzle, the gas filler nozzle having a movable locking member provided on the inner periphery to lock the suction nozzle when the suction nozzle is interlocked with the gas filler nozzle wherein the gas filler nozzle comprises:

an outer peripheral wall having a cylindrical shape;

an inner peripheral wall located inside the outer peripheral wall;

a space formed between the inner peripheral wall and the outer peripheral wall;

and a sleeve member configured to be movable in the space in an axial direction of the gas filler nozzle and to come into contact with a back face of the locking member to swing the locking member, and wherein the sleeve member has a groove which is provided on a surface opposed to the inner peripheral wall and which is extended along the axial direction.

9. The gas filling device according to claim 8, further comprising:

an operation unit configured to receive a user's input;

a storage tank configured to store a gas;

a valve configured to switch between delivery and non-delivery of the gas stored in the storage tank through the gas filler nozzle to outside thereof; and a controller configured to control the suction mechanism and the valve, wherein when the operation unit receives an input, the controller drives the suction mechanism to suck moisture inside the gas filler nozzle and subsequently opens the valve to deliver the gas toward the gas filler nozzle.

\* \* \* \* \*